(12) United States Patent
Tokizawa

(10) Patent No.: US 8,302,286 B2
(45) Date of Patent: Nov. 6, 2012

(54) METHOD FOR MANUFACTURING A STATOR WINDING

(75) Inventor: Takashi Tokizawa, Nagoya (JP)

(73) Assignee: Denso Corporation, Kariya (JP)

( * ) Notice: Subject to any disclaimer, the term of this patent is extended or adjusted under 35 U.S.C. 154(b) by 276 days.

(21) Appl. No.: 12/585,945

(22) Filed: Sep. 29, 2009

(65) Prior Publication Data

US 2010/0077599 A1    Apr. 1, 2010

(30) Foreign Application Priority Data

Sep. 30, 2008  (JP) ................ 2008-253204

(51) Int. Cl.
  *H01F 7/06* (2006.01)
(52) U.S. Cl. .......... 29/605; 29/604; 29/606; 29/603.24; 29/603.26; 242/328; 242/329; 242/365.3; 242/365.6; 310/179; 310/184; 310/198; 310/199
(58) Field of Classification Search .......... 29/602.1, 29/604–606, 603.24, 603.26, 603.236; 242/328, 242/329, 365.3, 365.6, 365.8, 366; 310/179, 310/184, 198, 199, 201, 210
  See application file for complete search history.

(56) References Cited

U.S. PATENT DOCUMENTS

| | | | |
|---|---|---|---|
| 6,376,961 B2 | 4/2002 | Murakami et al. | |
| 6,617,739 B1 * | 9/2003 | Kinoshita | 310/198 |
| 7,157,826 B2 * | 1/2007 | Rajasingham | 310/208 |
| 2004/0237287 A1 | 12/2004 | Bramson et al. | |
| 2006/0230603 A1 | 10/2006 | Hirota et al. | |
| 2007/0022596 A1 | 2/2007 | Nishimura et al. | |
| 2008/0155808 A1 | 7/2008 | Hirota et al. | |
| 2008/0155809 A1 | 7/2008 | Hirota et al. | |

FOREIGN PATENT DOCUMENTS

| | | |
|---|---|---|
| JP | A-58-72356 | 4/1983 |
| JP | A-59-191457 | 10/1984 |
| JP | A-8-47216 | 2/1996 |
| JP | A-9-56096 | 2/1997 |
| JP | A-10-191608 | 7/1998 |
| JP | A-2002-176752 | 6/2002 |
| JP | A-2007-37313 | 2/2007 |
| JP | A-2008-5674 | 1/2008 |
| WO | WO 2005/074105 A1 | 8/2005 |

* cited by examiner

*Primary Examiner* — Paul D Kim
(74) *Attorney, Agent, or Firm* — Oliff & Berridge, PLC

(57) ABSTRACT

A stator winding is manufactured by a forming step, a winding step, and a expanding step. In the forming step, an S-shaped offset shape is formed on a conductor part corresponding to a coil end part. Thereby, in a coil end part, it is possible to provide an expected shape stably at the coil end part. The conductor is wound around a bobbin in the winding step. In the winding step, a twisted shape is given to the conductor parts to be the inclined part of the coil end and the conductor part to be accommodated in a slot. In the expanding step, a preform product removed from the bobbin is expanded into a shape of the stator winding.

4 Claims, 26 Drawing Sheets

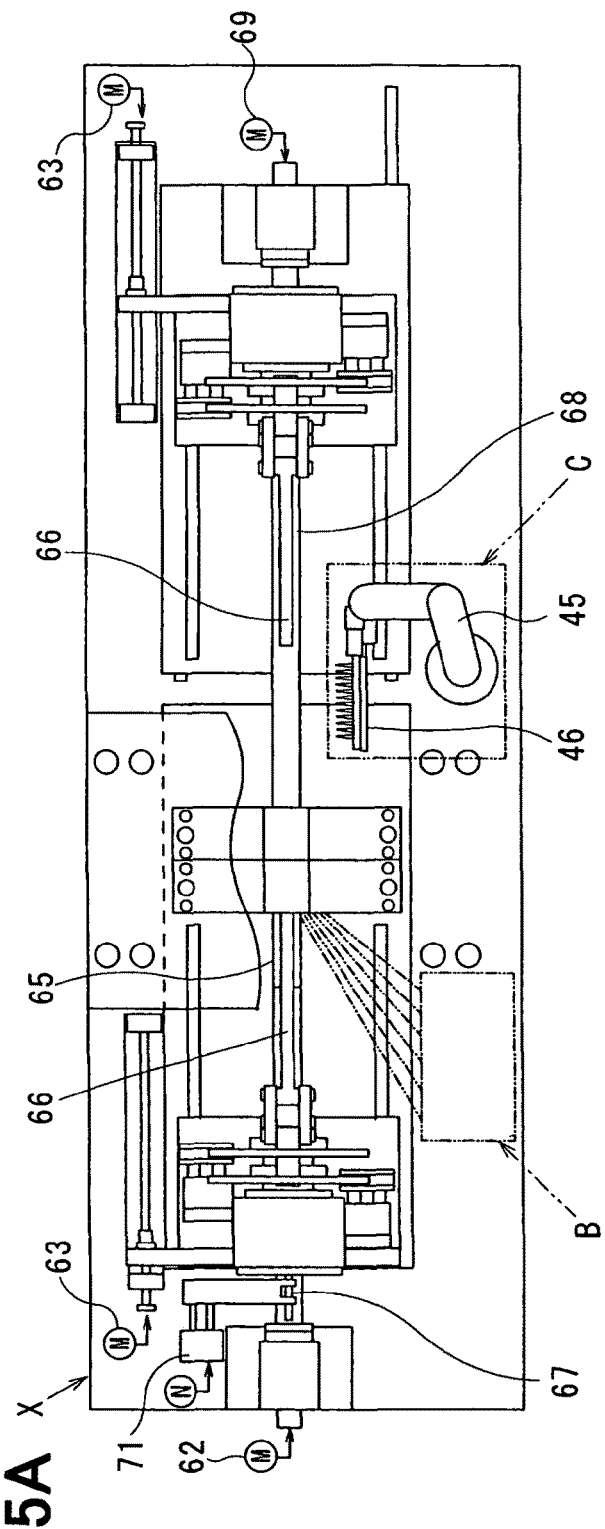
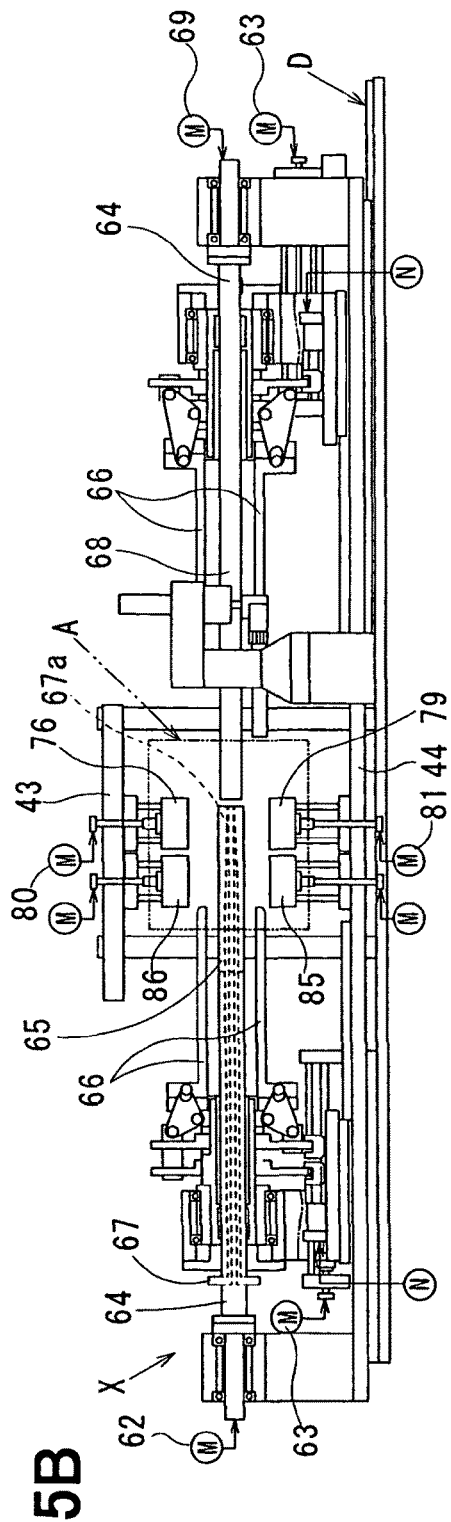
FIG. 5A
FIG. 5B

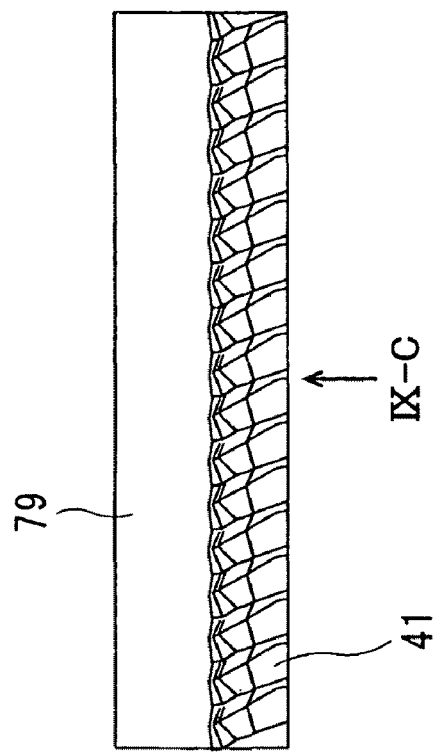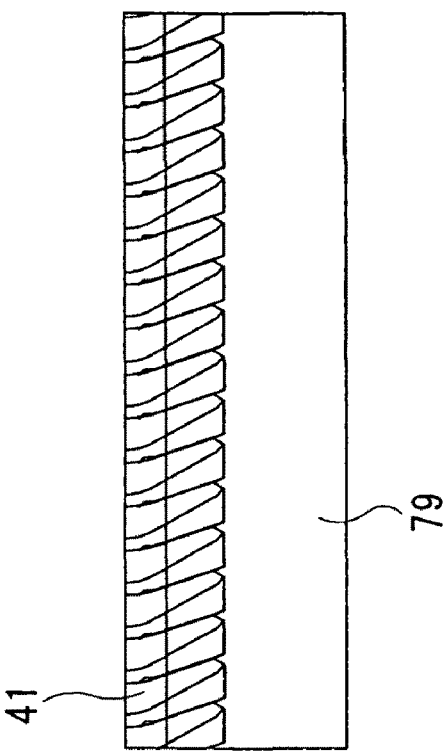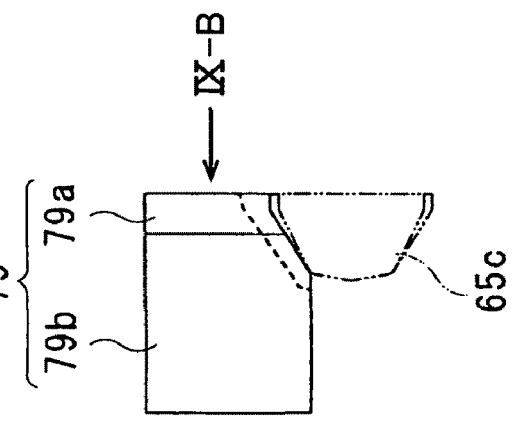

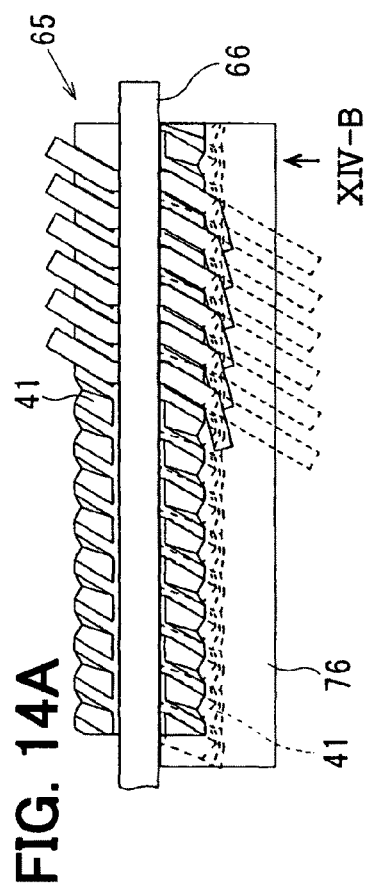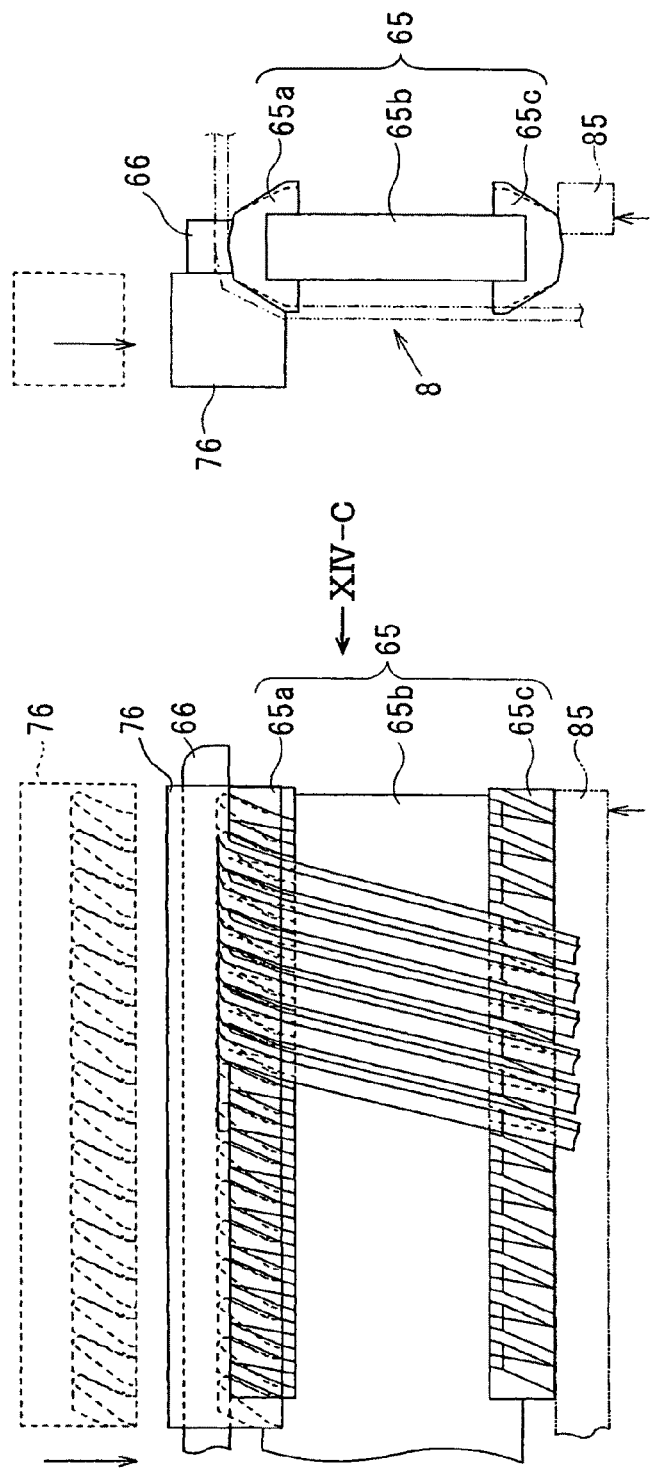

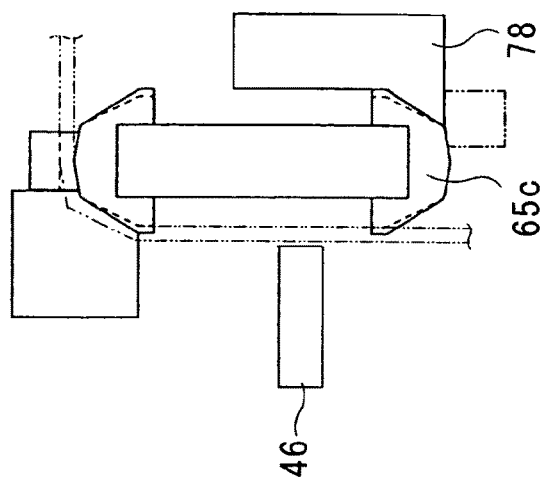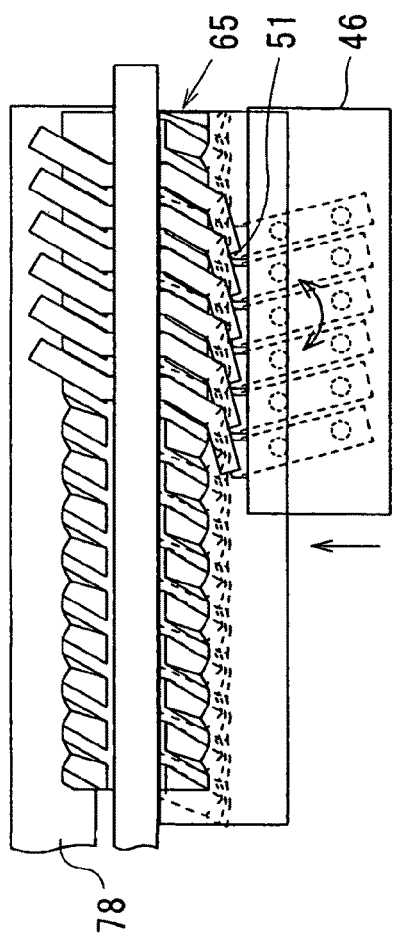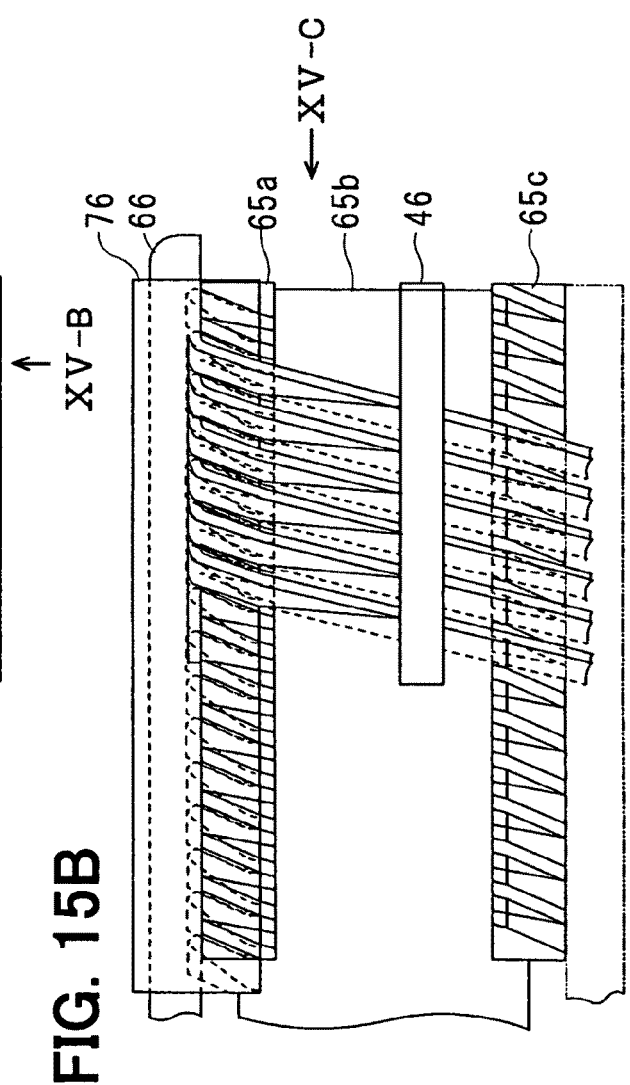

METHOD FOR MANUFACTURING A STATOR WINDING

CROSS REFERENCE TO RELATED APPLICATION

This application is based on Japanese Patent Application No. 2008-253204 filed on Sep. 30, 2008, the contents of which are incorporated herein by reference in its entirety.

FIELD OF THE INVENTION

The present invention relates to a method for manufacturing and an apparatus for manufacturing a stator coil of a rotary electric machine, such as an alternating current generator for a vehicle.

BACKGROUND OF THE INVENTION

In order to provide a small and high power rotary electric machine, it is necessary to increase the space factor of a stator winding within a slot of an stator core, and to form a coil end part, i.e., a jumper part of the stator winding at an outside of the slot, in a uniformly arrayed, in a small size, and in a high density manner.

A segment connecting type winding manufacturing method is known as one of the manufacturing method of and manufacturing machine for the stator windings. In this method, a plurality of U-shaped segments made of flat rectangular wires are inserted into slots of a stator core. Then, a winding is formed by connecting ends of the segments protruding from one end of the stator core by welding for example. A continuous wire type winding manufacturing method is also known as another one of the manufacturing method of and manufacturing machine for the stator windings. In this method, a circular or flat rectangular wire is continuously wound in a helical form. Then, the helical coil is compressed to provide a flat coil. Each one of loops on the flat coil is formed. Then, the coil is inserted into slots of the stator core. For example, the patent document 1 discloses one of the continuous wire type winding manufacturing method.

In the method of the patent document 1, a plurality of wires are simultaneously wound in a helical shape by using a pair of plate shaped winding cores in a winding step.

A shifting step is performed after this winding step. In the shifting step, ends of straight parts on a coil member are moved in opposite directions each other and in separating directions each other by using pins.

Patent document 1: JP-2002-176752-A

SUMMARY OF THE INVENTION

However, in the shifting step of the patent document 1, intermediate parts between a top end and a bottom end are not supported. Therefore, a shape of bent part between turning parts is defined by free deformation of the conductor by the tension of each turning parts. As a result, there is the possibility that the bent shapes become unstable because of wide variation of material strength, externally applied tension, orientation, and deforming amount, which are caused depending on turning parts. As a result, the straight part may get an inadvertent deformation, and may not be provided with a necessary level of the linearity and parallelism. Further, there is a possibility of trouble on process which includes the shifting step and succeeding steps.

In addition, there is a problem that a projecting length is too long and a size of a coil end is hardly reduced, since the turning part uses a V shaped bent structure or a loop shaped twisted structure.

The present invention was made in order to solve an aforementioned problem, and has an object to provide a manufacturing method and its manufacturing apparatus for a stator winding of a rotary electric machine, which are capable of reducing size of the coil end part and improving the space factor in the slot.

In one embodiment of the present invention, a forming step which forms a shape of a coil end part on a conductor is carried out before a winding step.

Thereby, offset shapes of the conductor are formed by the forming step before, then, after that, a winding step is performed. As a result, it is possible to keep an exact shape of the coil end part.

In another embodiment of the present invention, a stator winding is a wave winding. A coil end part has inclined parts and a top part. An expanding step rotates the inclined parts on both sides about a rotation center which is an axis passing through the slot conductor part and is parallel to a line passing through the top part and being vertical to an axis of the helical shape. In the expanding step, an inclined part placed on one side of the slot conductor part and an inclined part placed on the other side are expanded in opposite rotating directions each other. Such expanding step may be referred to as an inclined parts rotating step.

As a result, it is possible to perform expanding step in a measure for expanding pitch of the slot conductors by rotating the coil end parts on the winding that is folded and stacked. Therefore, it is possible to avoid applying deformation in opposite directions by pins. It is possible to avoid forming unnecessary deformations on a slot conductor part and a coil end part. As a result, it is possible to satisfy the linearity and parallelism of the slot conductor part and the accuracy of shape of the coil end part. Therefore, it is possible to improve the space factor of the winding and to form the coil end parts in a uniformly arrayed manner and in a small size.

In another embodiment of the present invention, a stator winding is a wave winding. A coil end part has an inclined part and a top part. The conductor has a rectangular shape in cross section. The winding step rotates the conductor itself in a twisted shape. The expanding step rotates the conductor in a reverse direction with respect to the twisted shape. As a result, the twisted shape applied by the winding step is undone.

According to the embodiment, folding and stacking of the winding in the winding step becomes easy. As a result, it is possible to wind the winding with high density. Further, in the expanding step, the turning part of the winding folded and stacked can be easily rotated, since an assist of a restoring force caused by the twisted shape is also applied. As a result, in a winding forming stage, the twisted shape is undone to a shape with small amount of twist. For example, it is possible to avoid damaging easiness of assembling process, even in a case where conductors with a rectangular shaped cross section are accommodated with less gaps in quest of a high space factor. Thus, a small size coil end parts can be formed without making manufacturing process be difficult. In addition, it is possible to manufacture with low cost, since equipment necessary for the expanding step can be simplified and number of processing is decreased.

In another embodiment of the present invention, a manufacturing apparatus for a stator winding of a rotary electric machine is provided with a winding device, a conductor supplying device, and a conductor twisting device. The winding device includes a winding core rotatable about an axis and formed in a columnar shape, the winding core having helical twisted grooves formed in a helical shape on both opposite sides thereof. The conductor supplying device includes a guide which supplies the conductor in one direction of the radial directions of the winding core, a portion which drives the guide by moving across a surrounding space, a portion which drives an angle of twisted shape and is capable of controlling a twisted angle of the conductor itself, and a conductor bobbin which is formed in a cylindrical shape rotatable about an axis. The conductor bobbin is supported rotatable about an axis perpendicular to the axis of the conductor bobbin. The conductor twisting device includes a twisting tool which has a plurality of comb teeth supported by pins in a pivotable manner and a cam mechanism engaging with the pins in a slidable manner. The plurality of comb teeth are constructed so that ends of the comb teeth swings when the comb teeth are pushed in axial directions. In the winding step, the helical twisted grooves forms the inclined parts of the coil end part, and the twisting tool forms the slot conductor part. As a result, the inclined part of the coil end part and the slot conductor part are formed in an outwardly-open twisted manner. In addition, the conductor that is not yet processed can be supplied in a twist releasing manner by using the conductor bobbin that is rotatable.

Thereby, the winding can be performed by easily applying twisted shapes to the inclined parts and the slot conductor part of the winding. It is possible to perform folding and stacking of the winding easily and securely, and to wind the winding with high density. In addition, it is possible to manufacture with low cost, since equipment necessary for the expanding step can be simplified and number of processing is decreased.

BRIEF DESCRIPTION OF THE DRAWINGS

Additional objects and advantages of the present invention will be more readily apparent from the following detailed description of preferred embodiments when taken together with the accompanying drawings. In which:

FIG. 5A is a plan view of a winding manufacturing apparatus, FIG. 5B is a side view of the winding manufacturing apparatus, FIG. 9A is a plan view of a lower former for forming inclined parts, FIG. 9B is a side view along an arrow IX-B in FIG. 9A, FIG. 9C is a side view along an arrow IX-C in FIG. 9B, FIG. 14A is a plan view showing a part of the winding device A in the second winding step, FIG. 14B is a side view along an arrow XIV-B in FIG. 14A, FIG. 14C is a side view along an arrow XIV-C in FIG. 14B, FIG. 15A is a plan view showing a part of the winding device A in a beginning step of the third winding step, FIG. 15B is a side view along an arrow XV-B in FIG. 15A, FIG. 15C is a side view along an arrow XV-C in FIG. 15B.

DETAILED DESCRIPTION OF THE PREFERRED EMBODIMENTS

Hereinafter, it is explained a first embodiment where the present invention is applied to a stator winding for an alternating current generator for a vehicle, a method for manufacturing the same, and an apparatus for manufacturing the same.

The alternating current generator for a vehicle is explained with reference to FIG. 1 to FIG. 3. The alternating current generator for a vehicle has a stator 1 and frames, not shown. The stator 1 is supported in a clamped fashion between the frames. A rotor is provided as a field and is supported in a rotatable manner. The stator 1 accommodates the rotor therein. The rotor is rotated by an internal combustion engine (engine) mounted on the vehicle. The stator 1 acts as an armature for generating a power output.

Figure 1:
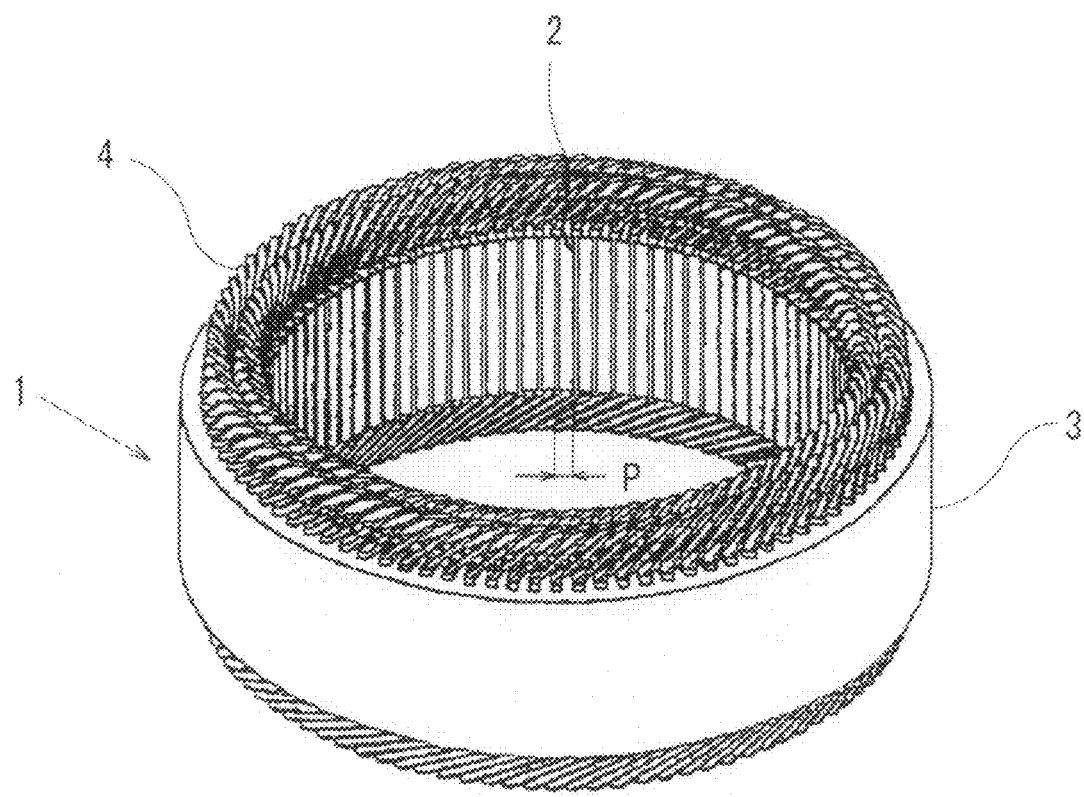
FIG. 1 is a perspective view showing a stator of an alternating current generator for a vehicle according to a first embodiment of the present invention.

In FIG. 1, the stator 1 includes a stator core 3 and a stator winding 4. The stator core 3 is formed in a cylindrical shape where a plurality of axially extending slots 2 are formed with predetermined slot pitch P in a circumferential direction. The stator winding 4 is wound and mounted on the slots 2 of the stator core 3.

Figure 2:
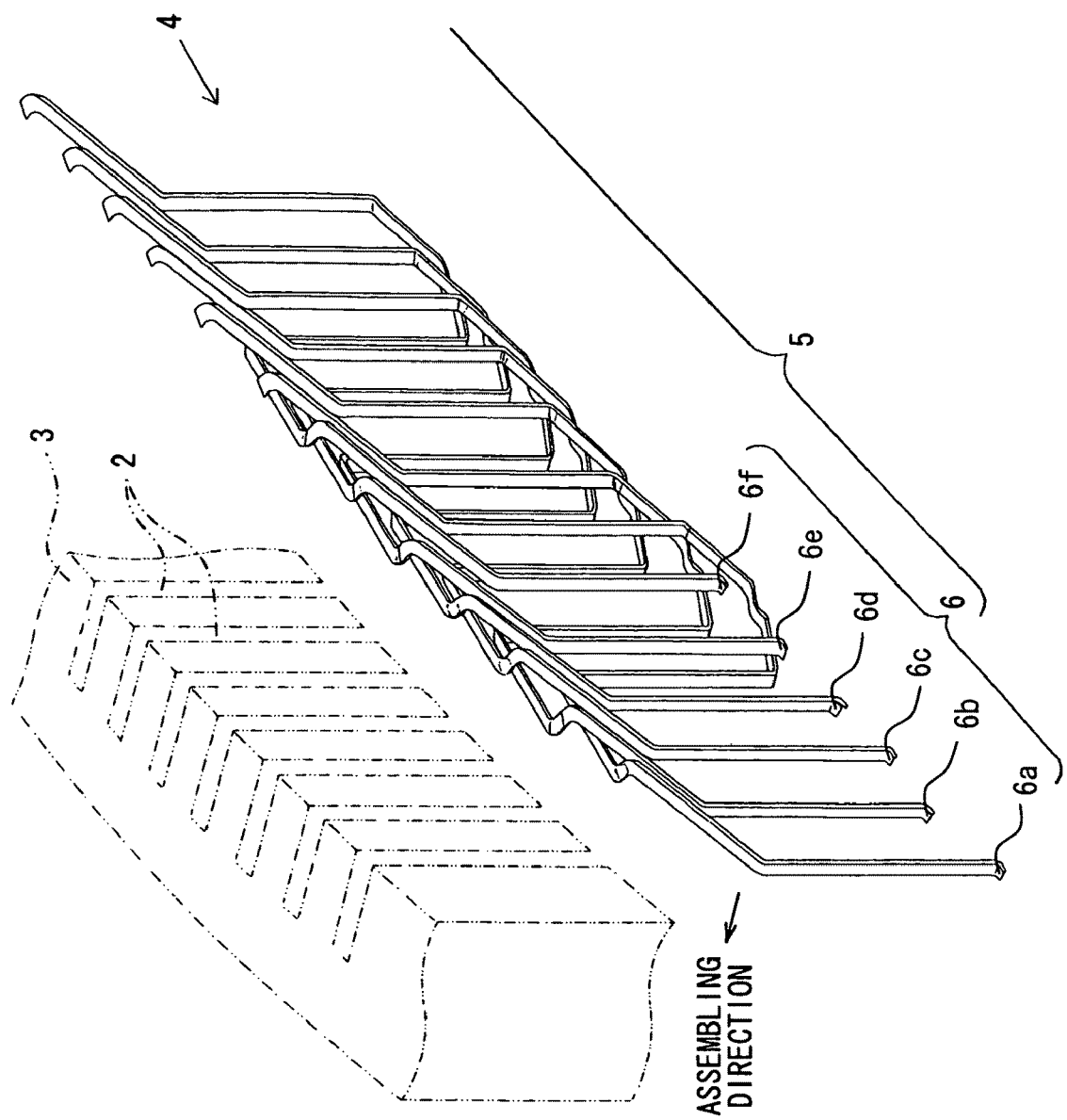
FIG. 2 is a perspective view showing a stator winding.

The stator winding 4 is made of a winding assembly 5 which has a shape manufactured by winding a plurality of wire members 6 in a helical shape as shown in FIG. 2. The winding assembly 5 includes six wire members 6a-6f. The winding assembly 5 is manufactured by the continuous wire type winding manufacturing method. First, conductors are continuously wound over a predetermined length into a helical shape from a beginning end to a finishing end. The wound conductors are rearranged in a predetermined arrayed pitch by expanding in a longitudinal direction after winding of the conductor is carried out. Thereby, a basic shape of the winding assembly 5 is provided. Then, the winding assembly 5 is assembled on the slots 2 of the stator core 3 to forms a cylindrical stator winding 4.

Figure 3:
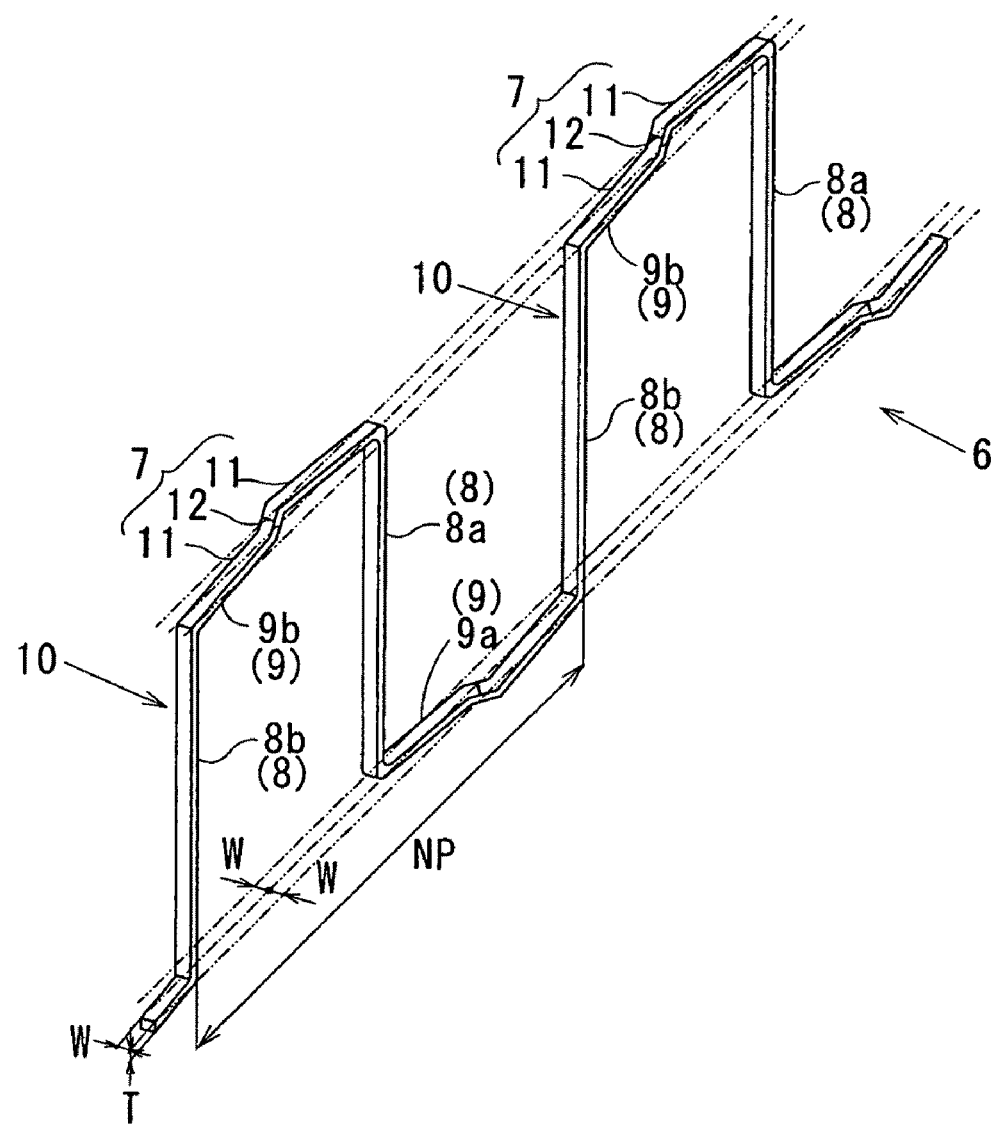
FIG. 3 is a perspective view showing one wire.

Each wire member 6 has a shape as shown in FIG. 3. A base conductor previously formed in an S-shaped offset shape is used. The base conductor is continuously wound in a helical shape so that an S-shape center part is placed as a turning part 9 of the winding. The wire member 6 has sloping portions (hereinafter referred to as sloping parts) which are placed orthogonally in the helical shape. The sloping parts are expanded into straight-line parts 8 which are formed in straight-line shapes and extending in an axial direction. As a result, first straight-line parts 8a located on a first plane and second straight-line parts 8b located on a second plane are formed. Further, first turning parts 9a and second turning parts 9b are formed to connect between adjacent pair of the straight-line parts 8a and 8b. The first plane on which a plurality of first straight-line parts 8a are located and the second plane on which a plurality of second straight-line parts 8b are located in parallel with a predetermined gap to oppose each other.

Here, a shape of one wire member 6 has a repeated shape repeated in the pitch NP. The pitch NP between the two straight-line parts 8a and 8a located on the same plane corresponds to a predetermined number N of the slots (N is a natural number). Regardless of the plane to which the straight-line parts belong, two straight-line parts 8a and 8b separately located by NP/2 are shifted by W in depth in a radial direction. Those straight-line parts 8a and 8b are arranged alternately in an inner layer (radial inside of the stator core 3) of the slots 2 and an outer layer (radial outside of the stator core 3) of the slots 2. The six wire members 6a-6f are arranged in parallel each other with the pitch P respectively. Therefore, regarding one of the slots 2, straight-line parts 8a and 8b of respective wire members 6 are assembled in the inner layer and the outer layer in the radial direction. For example, in one of the slots 2, the straight-line parts 8a and 8b of a plurality of wire members 6 which forms one electrical phase are accommodated in a stacked condition with respect to the radial direction at least.

The winding has slot conductor parts 10 and coil end parts 7. The slot conductor parts 10 are assembled within the slots 2. The coil end parts 7 are located on both ends outside the slots 2. The coil end part 7 is a jumper part which connects between adjacently located two of the slot conductor parts 10. The coil end part 7 is also referred to as a jumper part, a jumper line, or a turning part. The jumper parts include a jumper part which connects the slot conductor parts 10 from the inner layer to the outer layer with respect to one circumferential direction, and a jumper part which connects those from the outer layer to the inner layer. In a coil end protruding from the stator core, a plurality of jumper parts are overlapped. In addition, the coil end part 7 includes two inclined parts 11 for the coil end and a top part 12 for the coil end.

The conductors used for the wire members 6 are a long member of conductive materials, such as copper wire with insulation coating. For example, the conductor may have a circular or rectangular cross section. Preferably, the conductor is a flat rectangular conductor which has a width W and a thickness T. In one embodiment, W>>T is satisfied. In a case that a flat rectangular conductor is used, it is preferable that a gap between the first and second planes substantially corresponds to the width W of the conductor.

As stated above, the stator winding 4 is made of a plurality of continuous conductors. One conductor has a plurality of slot conductor parts accommodated in a plurality of slots of the stator core 3, and a plurality of coil end parts which connect between the slot conductor parts. The plurality of slot conductor parts are arranged at a radial inner side location or radial outer side location in the slot. Radial locations of the plurality of slot conductor parts in the slots are displaced in the inner side location and the outer side location in order along the circumferential direction. Therefore, a plurality of slot conductor parts are arranged so that the slot conductor parts are located in radial locations which, are alternately displaced in an inner side and outer side manner along a circumferential direction. The stator winding 4 is a wave winding.

The stator winding 4 is a poly-phase winding. The stator winding 4 has two sets of three-phase windings connected in a three-phase connection. Leader lines provided as ends of respective phases are bent at the top parts 12 used as the center part of the coil end so as to extend along an axial direction. The leader lines include leader lines for terminals, such as U, V, and W. In addition, the leader lines include a terminal formation parts which are formed for connection with other predetermined wire members 6. For example, the leader lines include a line for a neutral point connection in the three phase star connection. In order to simplify explanation and understanding of many coil end parts 7, illustrations and explanations for the leader lines are omitted.

Next, a method for manufacturing the stator 1 having a structure explained above and a manufacturing apparatus for the same are explained below based on FIG. 4 to FIG. 11.

Figure 4:
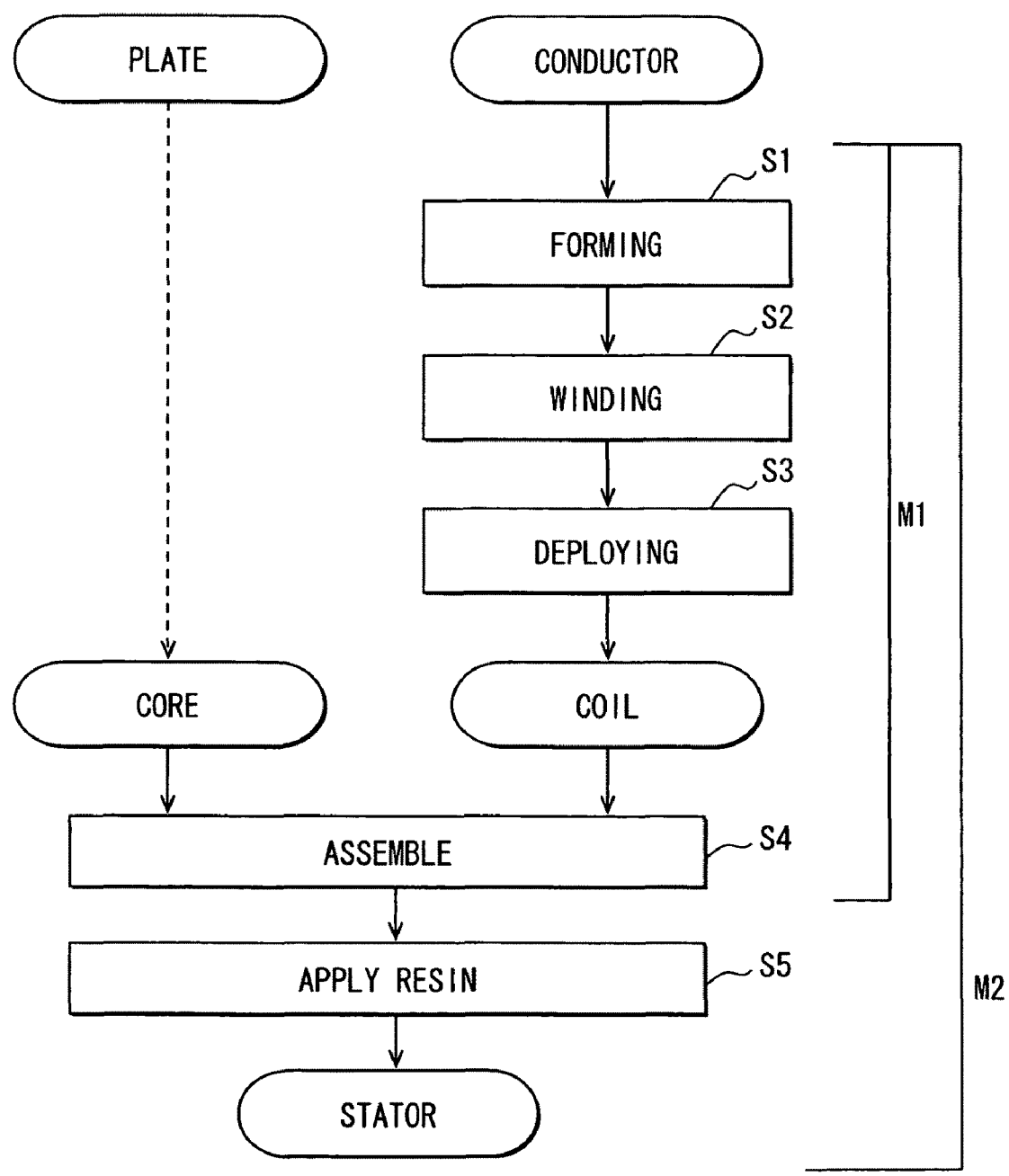
FIG. 4 is a flow chart showing a manufacturing method.

In FIG. 4, the manufacturing method M1 for the stator winding 4 includes at least a base conductor forming step S1, a winding step S2, an expanding step S3, and an winding assembling step S4. The manufacturing method M1 for the stator winding includes a step which assembles the stator core 3 and the stator winding 4 which is a formed winding uniformly arrayed. A manufacturing method M2 for the stator 1 may include the base conductor forming step S1, the winding step S2, the expanding step S3, the winding assembling step S4, and a resin impregnation step S5. The stator 1 is completed with this manufacturing method M2.

First, a manufacture apparatus is explained below.

The manufacture apparatus X is mainly used in the winding step S2. The manufacture apparatus X includes a winding device A, a conductor supplying device B, a conductor twisting device C, and a frame D, as shown in FIG. 5A and FIG. 5B.

The winding device A includes a winding core 65 which has a shrinkable mechanism. The winding core 65 may be also referred to as a coil former 65 or a bobbin 65. The bobbin 65 is a tool for winding a plurality of conductors simultaneously and collectively in a helical shape. The winding device A has a wire gripper 66 which grips the conductors at a predetermined location and angle on the bobbin 65. Two wire grippers 66 are disposed to surround the bobbin 65. The wire grippers 66 are disposed on an upper side and a lower side with respect to the bobbin 65. The bobbin 65 is connected with a bobbin rotation driving means 62, e.g., a rotation driver with an electric motor, via a transmission shaft 64. The wire gripper 66 is connected with a gripper driving means 63, e.g., a driver with an electric motor, so as to be movable in a radial direction and an axial direction of the bobbin 65. Both the bobbin rotation driving means 62 and the gripper driving means 63 are fixed on the frame D in an axially movable manner respectively.

Figure 6C:
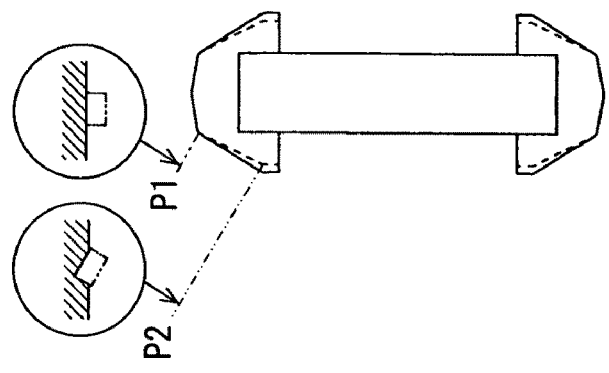
FIG. 6C is a side view along an arrow VI-C in FIG. 6B.
Figure 6A:
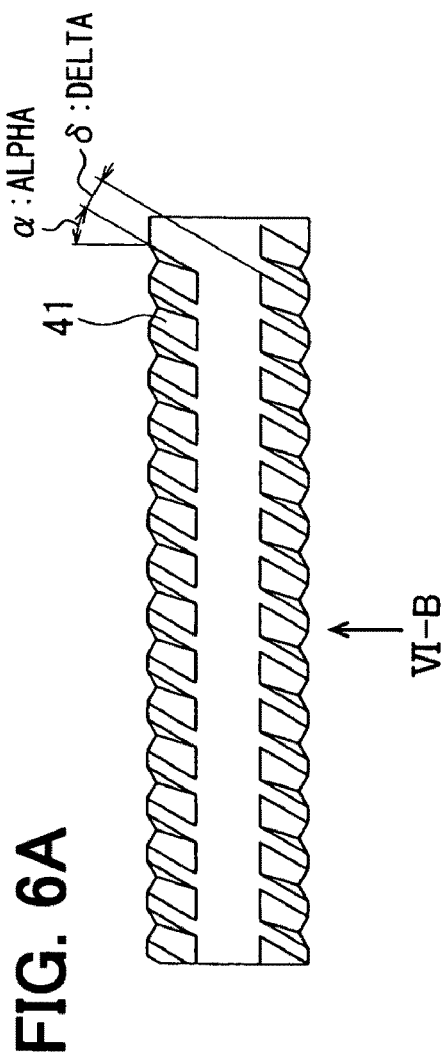
FIG. 6A is a plan view of a bobbin as a winding core.
Figure 6B:
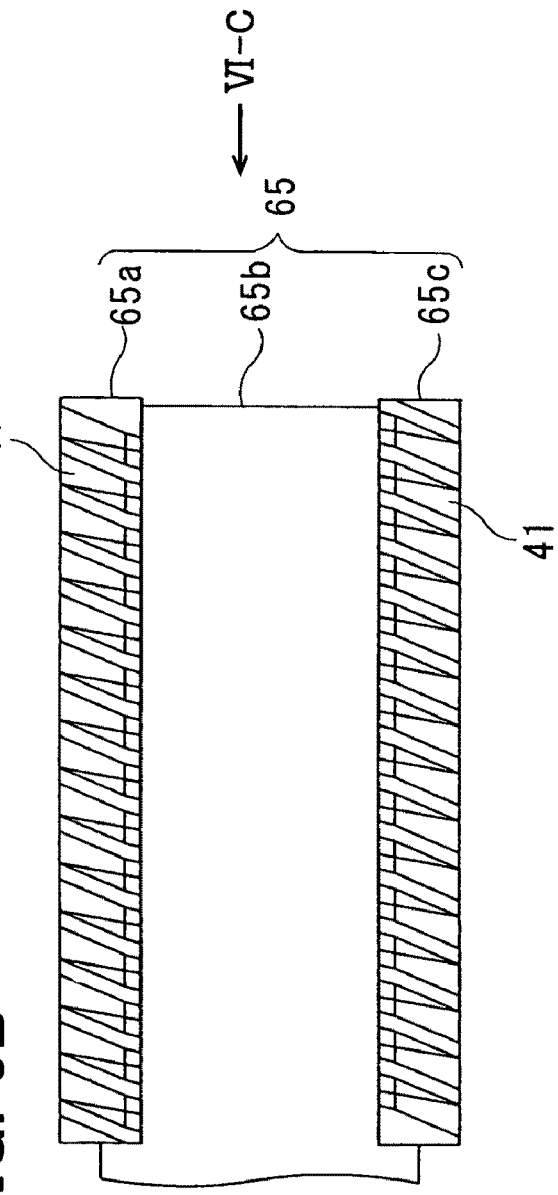
FIG. 6B is a side view along an arrow VI-B in FIG. 6A.

The bobbin 65 includes an upper core 65a, a middle core 65b, and a lower core 65c, as shown in FIGS. 6A-6C. The upper core 65a may be also referred to as an upper bobbin 65a. The middle core 65b may be also referred to as a middle bobbin 65b. The lower core 65c may be also referred to as a lower bobbin 65c. The upper bobbin 65a and the lower bobbin 65c are formed in the same shape and are oppositely disposed. The naming of upper and lower is used only for convenience, the upper and lower bobbins 65a and 65b may be referred to as a right and left or a first and second respectively. The middle bobbin 65b is disposed between the upper and lower bobbins 65a and 65b in a slidable manner along a radial direction. A wedge mechanism 67 has wedge parts 67a which are disposed in gaps in a slidable part between the middle bobbin 65b and the upper and lower bobbins 65a and 65c, or in an outside of the slidable part between the upper and lower bobbins 65a and 65c, as shown in FIG. 5A. The wedge mechanism 67 enables the upper and lower bobbins 65a and 65c to shrink in an approaching manner each other by moving the wedge parts 67a in an axial direction, and, thereby, enables the bobbin 65 to release the winding. The wedge mechanism 67 is driven by a wedge axial moving means 71, e.g., a pneumatic type device (air cylinder).

As shown in FIGS. 6A-C, the upper bobbin 65a and the lower bobbin 65c are trapezoidal shape in cross section. The upper side is formed in a convex shape which has gently inclined slant surfaces on both sides. The upper side may be formed in a convex shape which is defined by slant surfaces with steps. The oblique side surfaces are formed with guide grooves 41. The guide grooves 41 may be referred to as helical twisted grooves 41. Each guide groove 41 inclines by a helical angle ALPHA to an axial direction of the bobbin 65. In addition, each guide groove 41 is formed to twist slightly with respect to an extending direction of the helical shape. Further, the guide grooves 41 are formed in a predetermined pitch. The guide grooves 41 are formed in both oblique side surfaces. The guide grooves 41 are formed on both upper and lower bobbins 65a and 65c.

As shown in FIG. 6C, each guide groove 41 is formed in a shape defined with an upper bottom part P1 which is parallel to the axial direction of the bobbin 65. Therefore, it can be said that the bottom shape of the guide groove 41 is a flat at the upper bottom part P1. Each guide groove 41 is formed in a shape defined with a lower bottom part P2 which is defined with a maximum inclination angle. As a result, the conductor put on the guide groove 41 is twisted as shown in FIG. 6C. The inclination of the bottom of the guide groove 41 is gradually changed continuously over the oblique side surface of the trapezoidal shape in cross section. The shape of the bottom of the guide groove 41 may be called as a shape formed in an outwardly-open twisted manner. Here, the outwardly-open twisted shape means a shape of the conductor which spreads and opens outwardly by a restoring force from the outwardly-open twisted shape, when the conductor is released from a holding condition where the conductor is twisted in the outwardly-open twisted shape. The shape of the bottom of the guide groove 41 is formed in a gently sloped surface or in a multi-step shape.

In addition, the guide grooves 41 are not arranged in a symmetrical arrangement on both oblique side surfaces. As shown in FIG. 6A, they have a shape and an arrangement almost correspond to the base conductor formed in the offset shape. The upper bottom part P1 is formed with a substantially flat surface extending continuously along an axial direction. A set of guide groove elements is provided by a pair of guide grooves 41 arranged with an offset distance DELTA on oblique side surfaces placed on both sides to the flat surface. That is, a plurality of guide grooves 41 are constructed so as to receive the base conductor formed in the S-shape or offset shape in a firmly inserted manner.

Here, an inclination angle of the helical angle ALPHA and an offset distance DELTA may be set in order to avoid interference among the conductors. For example, it is desirable to set so that a plurality of conductors do not interfere each other at a winding step. Further, the slot conductor itself is wound while it is applied with a twist. For this reason, it is desirable to set it so as to avoid interference with a slot at an assembling step into the slot 2. For example, it may be set based on a leading amount in the axial direction of the bobbin 65 per one rotation and a shape of a jumper part with the inclined parts (the offset distance DELTA, slot conductor part pitch NP) so that the permanent stress of the twist becomes the minimum value in order to avoid being damaged. In the embodiment, since the conductor served in the process is the S-shaped base conductor, overlapping may easily occur at the S-shaped portions. In this case, the conductors are overlapped so that the conductor on a winding start side in the axial direction of the bobbin 65 is placed on an under side (behind side). Thereby, the arranging pitch for arranging the conductors in parallel can be set small. As a result, it is possible to obtain a winding assembly 5 with even higher density easily.

The winding device A is provided with a winding receiver core device 68. The winding receiver core device 68 may be also referred to as a holder 68. The holder 68 stocks the winding assembly 5 in order to manufacture a continuous helical winding. The holder 68 repeatedly accumulates windings wound for certain number of rotations on the bobbin 65. The holder 68 is disposed horizontally in accordance with a center axis of the bobbin 65, and is distanced to define a predetermined gap. Two wire grippers 66 are disposed on an upper side and a lower side to surround the holder 68. The wire grippers 66 prevent modification and decomposition of the winding accumulated one by one. The holder 68 is connected with a core driving means 69, e.g., a driver with an electric motor, via a transmission shaft 64. The wire gripper 66 is connected with a gripper driving means 68, e.g., a driver with an electric motor, so as to be movable in a radial direction and an axial direction of the holder 68. Both the core driving means 69 and the gripper driving means 63 are fixed on the frame D in an axially movable manner respectively.

Figure 22A:
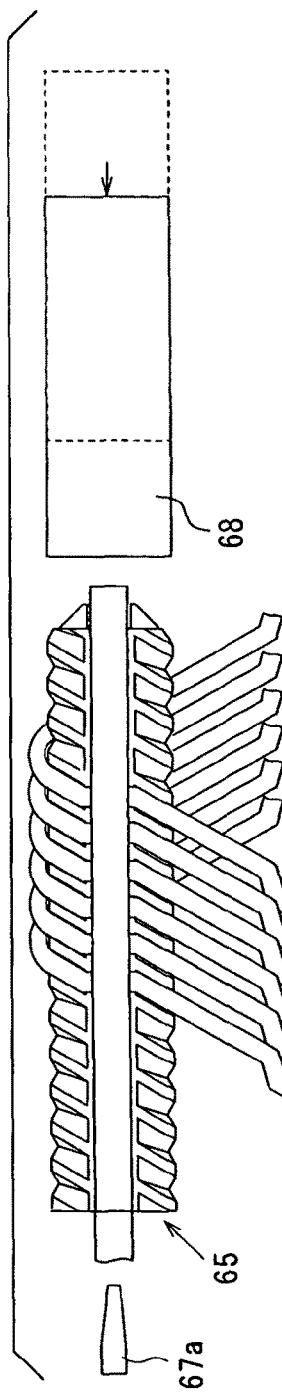
FIG. 22A is a plan view showing a part of the winding device A in a seventh winding step.
Figure 22B:
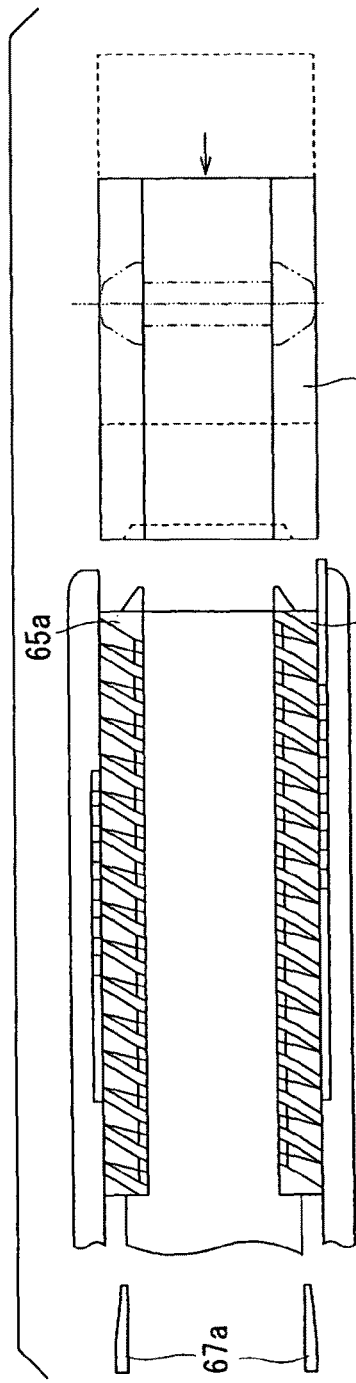
FIG. 22B is a side view along an arrow XXII-B in FIG. 22A.
Figure 22E:
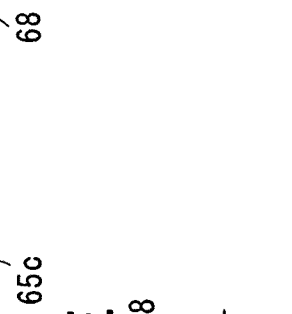
FIG. 22E is a sectional view showing a condition where the bobbin and the holder apply compression.
Figure 22D:
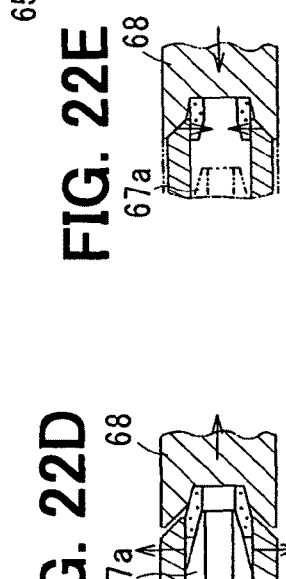
FIG. 22D is a sectional view showing a condition where the bobbin and a holder apply no compression.
Figure 22C:
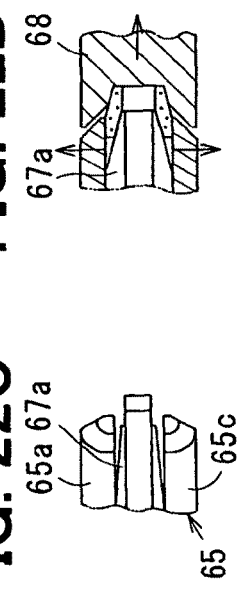
FIG. 22C is a plan view showing an end of a bobbin.

The holder 68 is moved in the axial direction by the core driving means 69. The holder 68 can came in contact with a distal end part of the bobbin 65 by moving in a forward direction by a predetermined distance. The distal end part of the bobbin 65 is shown in FIG. 22C. As shown in FIG. 22D and FIG. 22E, a contact recess of conical shape is formed on the distal end part of the holder 68. On the other hand, a contact protrusion of truncated cone shape is formed on the distal end of the bobbin 65. For example, an elastic member is disposed between the contact recess and the contact protrusion as shown in FIG. 22D and FIG. 22E. The bobbin 65 is further compressed by the contact recess by further pressing after the contact protrusion and the contact recess come in contact with each other as shown in FIG. 22E. Gaps in the bobbin 65 created by displacement of the wedge parts 67a are narrowed by compressing the bobbin 65. As a result, the bobbin 65 shrinks so as to become small in the radial direction. Thereby, it is possible to make the winding easy to be released from the bobbin 65. Therefore, it is possible to make the winding easy to be transferred from the bobbin 65 to the holder 68.

Figure 7:
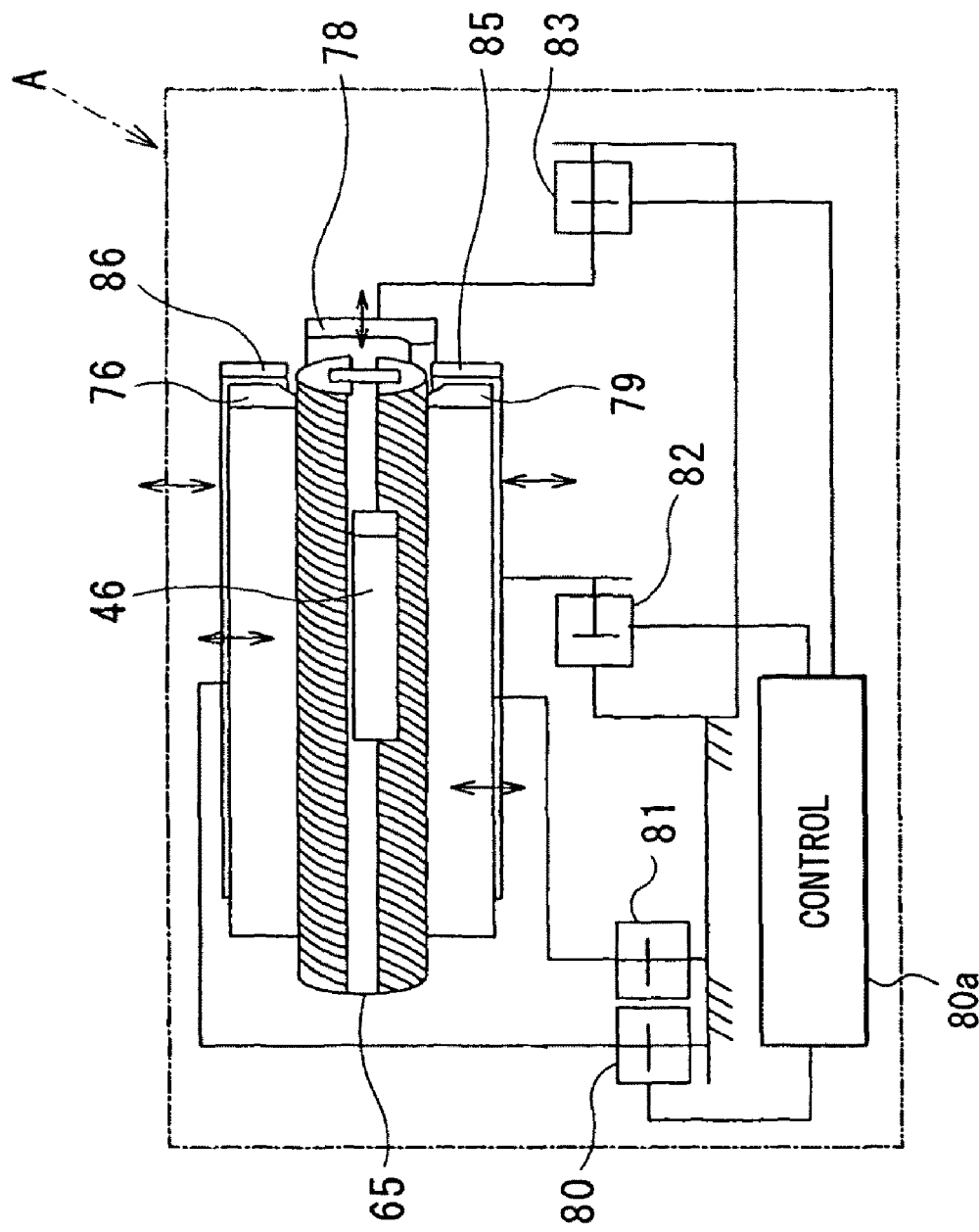
FIG. 7 is an enlarged view of a winding device A.

In addition, as shown in FIG. 7, the winding device A has a press-type forming device for forming the inclined parts 11 and the top parts 12 both of which will become the coil end parts 7 into desired shapes. The forming device is provided with at least one of an upper forming member 76 for forming the inclined parts and a lower forming member 79 for forming the inclined parts. Further, an lower surface support member 85, an upper surface support member 86 and a side surface support member 78 all of which supports pressing load when the pressing operation of the upper and lower forming members 76 and 79 are disposed on an upper side, a lower side and a lateral side in a horizontal direction respectively to surround the bobbin 65. The lower surface support member 85 may be also referred to as a lower support 85. The upper surface support member 86 may be also referred to as an upper support 86. The side surface support member 78 may be also referred to as a side support 78. The upper forming member 76 may be also referred to as an upper former 76. The lower forming member 79 may be also referred to as a lower former 76. The naming of upper and lower are used only for convenience, the upper and lower formers 76 and 79 may be referred to as a right and left or a first and second respectively.

The upper former 76 is fixed to a support plate 43 which is structured in a gate configuration as shown in FIG. 5B. The lower former 79 is fixed to a support plate 44 on the frame D. The upper and lower former 76 and 79 are connected with the upper former driving means 80 and the lower former driving means 81, e.g., a servo type driver, and are independently enabled to perform press forming by going up or down in an up and down direction respectively.

In addition, the lower support 85 and the upper support 86 are disposed on an upper side and a lower side of the bobbin 65 in parallel with the upper and lower formers 76 and 79. Further, the horizontal support 78 is disposed on a side in a horizontal direction of the bobbin 65. These supports 78, 85, and 86 are controlled in accordance with the operation of the upper and lower formers 76 and 79.

Figure 8B:
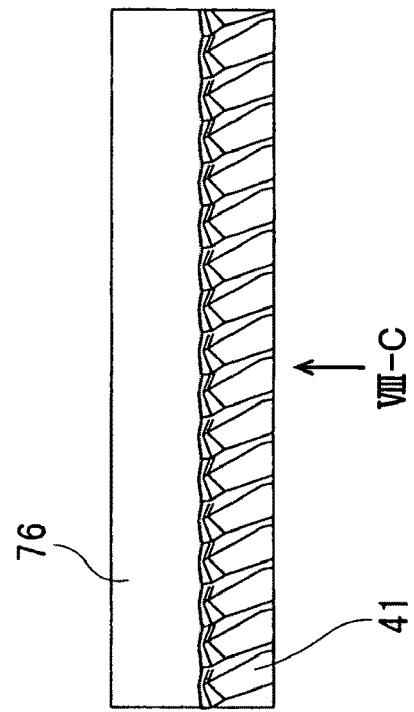
FIG. 8B is a side view along an arrow VIII-B in FIG. 8A.
Figure 8C:
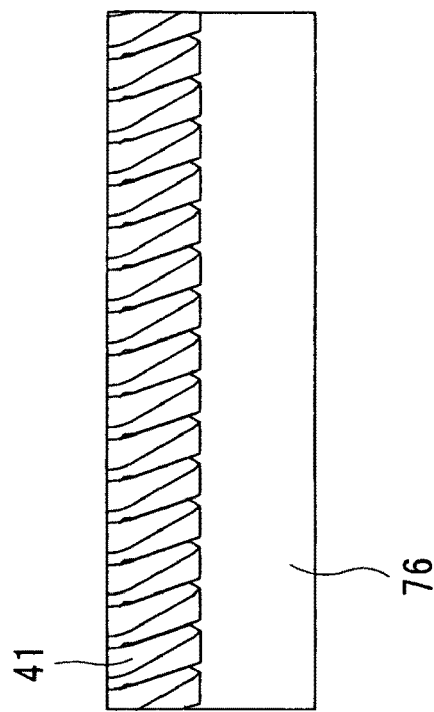
FIG. 8C is a side view along an arrow VIII-C in FIG. 8B.
Figure 8A:
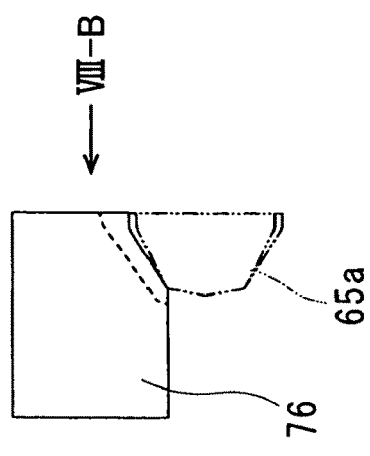
FIG. 8A is a plan view of an upper former for forming inclined parts.

Here, the upper former 76 is in a relationship to construct a combination of punch and die with respect to the bobbin 65. As shown in FIG. 8, the upper former 76 has a surface opposite to the upper bobbin 65a. The surface is formed with guide grooves 41 which are transferred from the shape of the upper bobbin 65a and have predetermined depth. By using the upper bobbin 65a and the upper former 76, it is possible to give a twisted (inclination) shape to the conductor therebetween.

In addition, the lower former 79 is in a relationship to construct a combination of punch and die. As shown in FIG. 9, the lower former 79 is a two parts separatable former. Such a separatable structure may also be applied to the upper former 76. The number of parts in the separatable structure may be changed. The lower former 79 is disposed to oppose to the lower bobbin 65c. The lower former 79 performs press works by upwardly moved. The lower former 79 includes partial formers 79a and 79b which divides the press-forming surface into an upper part and a lower part in an asymmetrical fashion. The partial formers 79a and 79b divide an area of the conductor to be formed at a center location between the top part and the slot conductor part. The lower former 79 has a surface opposite to the lower bobbin 65c. The surface is formed with guide grooves 41 which are transferred from the shape of the lower bobbin 65c and have predetermined depth.

By using the lower bobbin 65c and the lower former 79, it is possible to give a twisted shape to the conductor therebetween. Further, by performing movement of the partial former 79a and movement of the partial former 79b independently, it is possible to give more exact shape while preventing a slip of the material during the press forming. Each of the driving means 80, 81, 82, and 83 can be provided by a hydraulic cylinder or a pneumatic cylinder. These driving means 80, 81, 82, and 83 can be controlled by a fluid pressure driver system and a control device 80a.

Figure 10:
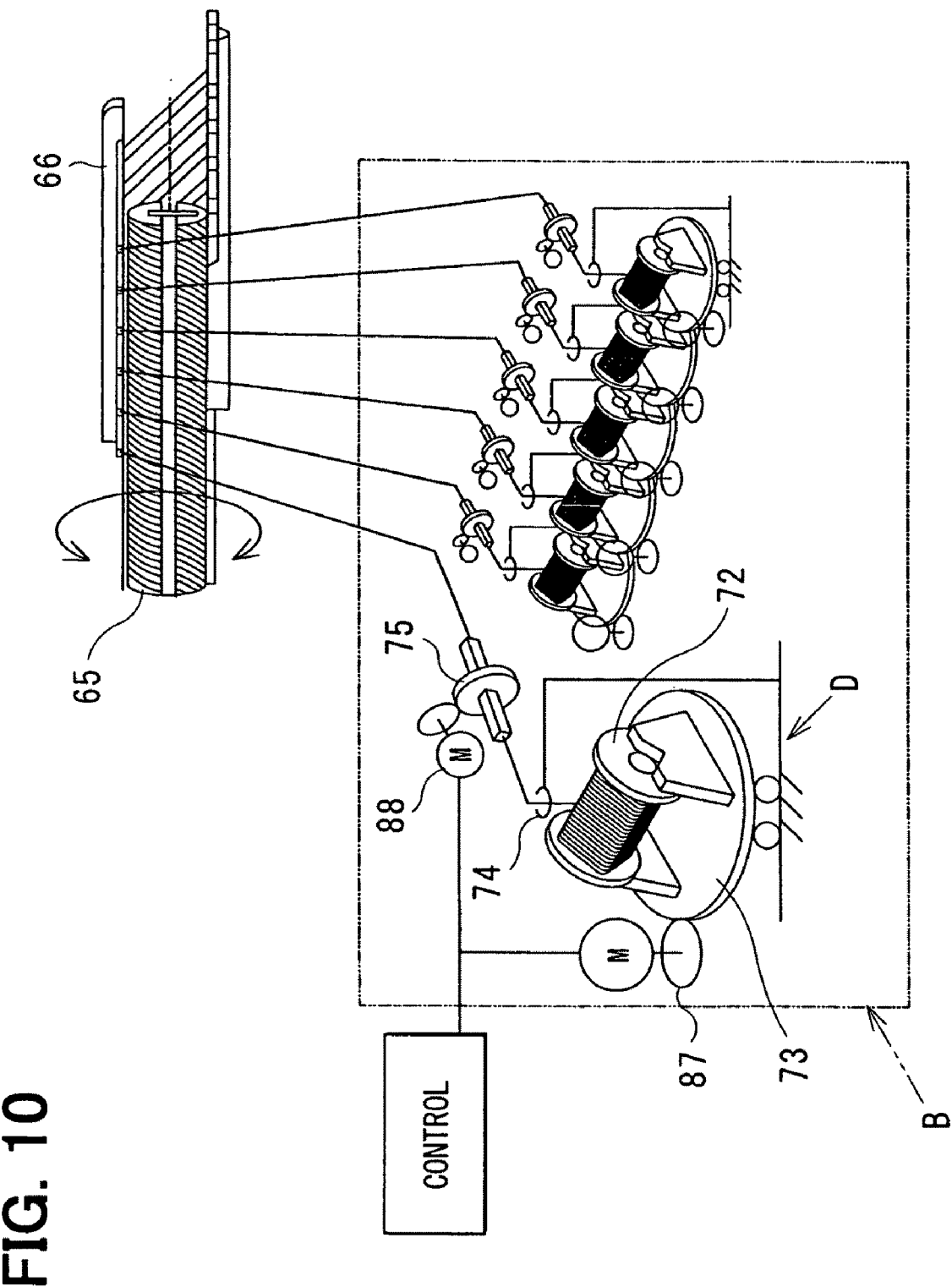
FIG. 10 is an enlarged view of a conductor supplying device B.

Next, the conductor supplying device B is constructed as shown in FIG. 10. The conductor supplying device B has a cylindrical conductor bobbin 72. A conductor (base conductor) formed in a predetermined offset shape in a conductor forming step previously is wound on the conductor bobbin 72 in a coil shape. The conductor bobbin 72 is supported on the conductor bobbin support 73 in a rotatable manner on its own axis. It is possible to supply the conductor continuously from a circumferential direction of the conductor bobbin 72. In addition, the conductor bobbin support 73 is also disposed on the frame D in a rotatable manner.

Here, the conductor bobbin support 73 is a mounting base formed in a disc shape. The center of the mounting base is supported by a bearing etc. The mounting base is configured to be rotated in both rotating directions by rotating an outer circumference thereof by a conductor bobbin rotary driving means 87. Therefore, it is possible to rotate the conductor bobbin 72 about a rotation center which is an axis passing through a middle point of the conductor bobbin 72 in an axial direction and crossing perpendicularly with an axis of the conductor bobbin 72. As a result, in performing rewinding of the conductor from the conductor bobbin 72, it is possible to give a twist on the conductor positively. In addition, when an adverse twist is formed on the conductor, it is possible to cancel such an adversely formed twist.

A supplying direction of the conductor pulled out from the conductor bobbin 72 is adjusted by passing through a conductor guide 74. Further, it is possible to give a predetermined twist necessary for winding on the bobbin to the conductor by a conductor rotating means 75 which is a supply angle adjusting means. For example, in a case that the rectangle conductors shown in FIG. 2 are wound in a folding and stacking manner to perform winding for the winding assembly 5, it is necessary to supply the conductors while rotating them, in order to prevent that each conductor itself is twisted adversely. As shown in the drawing, the conductor rotating means 75 has a disc formed in a circular plate shape and a hollow rectangular columnar member located on a rotation center of the disc. The inside of the hollow rectangular columnar member is formed in a rectangular shape which is approximately identical to the sectional shape of the conductor. The hollow rectangular columnar member is penetrated for being inserted with the conductor in a longitudinal direction. The conductor rotating means 75 is rotated in both rotating directions by the conductor rotary driving means 88. In addition, the device is configured to be able to move the guide in the three dimensional directions with respect to the bobbin.

The conductor bobbin support 73, the conductor bobbin 72, the conductor guide 74, the conductor rotating means 75, and those driving means 87 and 88 construct one conductor supplying unit. The supply angle adjusting means for controlling an amount of a twist on the conductor can be provided not only by the means 75 but by various configurations. The conductor supplying device B is provided with a plurality of conductor supplying units as shown in FIG. 10. In this embodiment, it has six sets of the conductor supplying units in order to supply six conductors. The conductor is pulled, out from the conductor bobbin 72 and passes the conductor guide 74. The conductor is applied with twisting rotation by the conductor rotating means 75, and is supplied on the bobbin 65. The conductor rotating means 75 and the conductor bobbin support 73 may be synchronously rotated in order to avoid an undesirable twist.

The conductor bobbin may be configured so that the conductor is pulled out in an axial direction of a cylindrical shape, a radial direction, or a circumferential direction of the conductor bobbin. In a case of configuration where the conductor is pulled out in the axial direction of the cylindrical shape, it is possible to effectively utilize the twist produced when pulling out the conductor from the conductor bobbin. It is possible to produce a twist easily by configuring the conductor bobbin to rotate about a center which is a direction perpendicularly crossing an axis. In addition, since it is necessary to rotate the conductor bobbin on its own axis only, and is not necessary to perform an orbital movement, it is possible to make an apparatus small.

Next, the conductor twisting device C is provided with a robot arm 45 and a conductor twisting member 46 which is attached on the arm part as shown in FIG. 5. The robot arm 45 is a one that is well known and is movable in full three dimensional directions by an electromotive servo actuator. The conductor twisting member 46 is explained based on FIG. 11.

The conductor twisting member 46 may be referred to as a twisting tool 46. The twisting tool 46 is a one that gives rotating twist deformations to a plurality of conductors at one operational cycle. The rotating twist deformation is given by rotating the conductor about a rotating axis which is a center of a cross section of the conductor. The rotating twist deformation forms the conductor which is deformed in a twisted shape. The rotating twist deformation is given to the slot conductor part 10 of the stator winding 4 which is to be inserted into the slot 2. That is, the twisting tool 46 gives a rotating twist deformation to the conductor for the sloping part in the winding wound in the helical shape at the time of the winding step. The conductor for the sloping part is a part which is formed after the expanding step and becomes the straight-line part 8.

Figure 11:
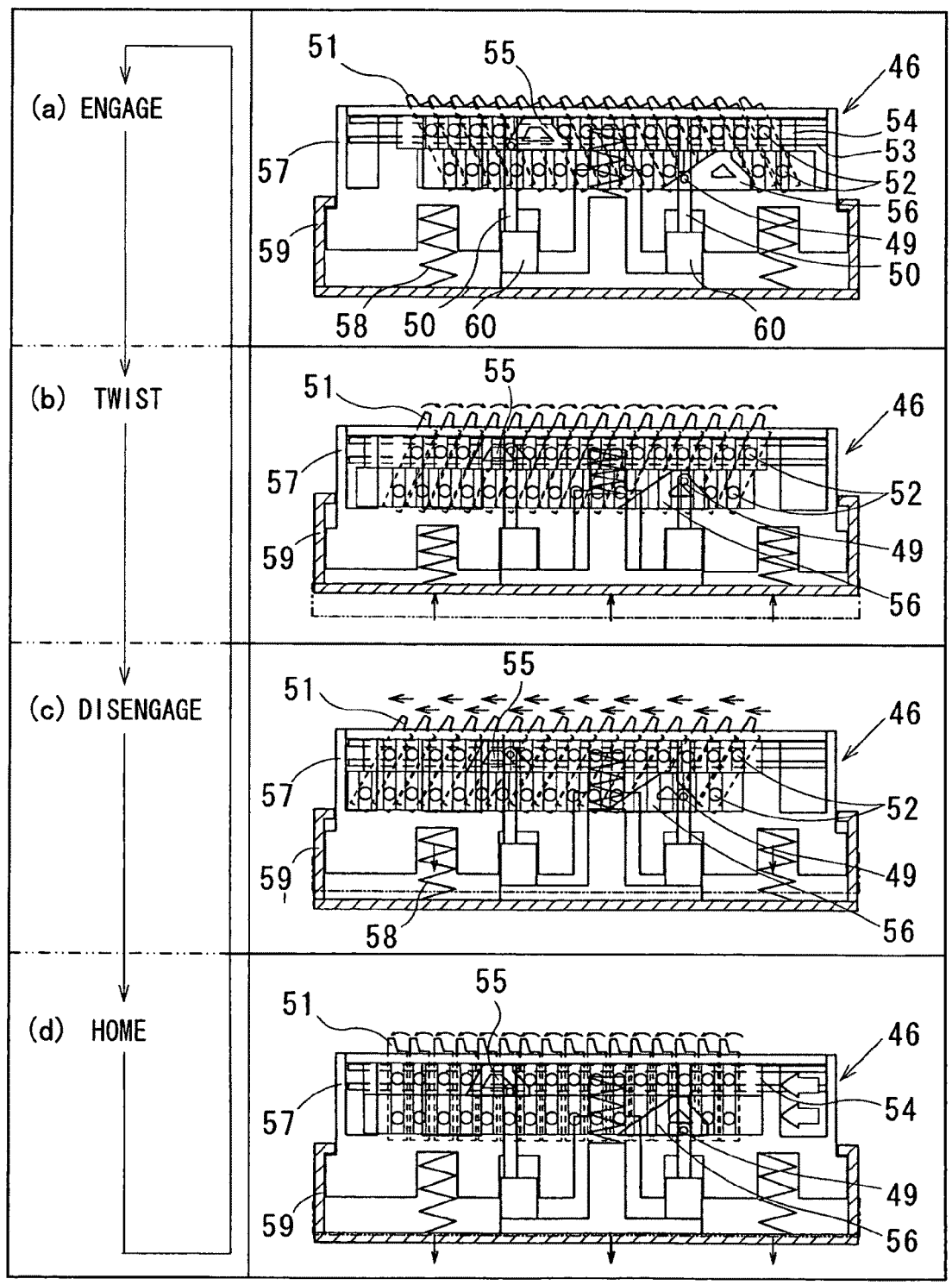
FIG. 11 is a flow chart showing a processing sequence of a twisting tool, where (a) shows a condition when comb teeth are completely inserted, (b) shows a condition when the conductors are completely twisted, (c) shows a condition when the comb teeth are completely released, and (d) shows a condition when the comb teeth are returned to a home position.

The twisting tool 46 is provided with a plurality of comb teeth 51 as shown in FIG. 11. Each of the comb teeth 51 is a rectangular columnar shape with a distal end part which has a notch corresponding to an outer shape of the conductor. Each of the comb teeth 51 is attached with pins 52 which are attached to two predetermined locations along a longitudinal direction thereof. The pins 52 are guided by a pair of pin guides 53, and are movable. Each of the comb teeth 51 rocks as the pins 52 move. A plurality of comb teeth 51 are arranged in parallel. A plurality of pins 52 belonging to a plurality of comb teeth 51 are arranged in one row along an arranging direction of a plurality of comb teeth 51. A slotted slider 54 which receives the pins 52 in the slot is attached. Further, as an embodiment capable of changing an operating direction, a cam 55 which has a predetermined cam pattern is attached on a side of the slotted slider 54 opposite to the pins.

In addition, a slotted slider 54 is also attached to similarly configured pins 52 located on the other one location. This slotted slider 54 is provided with a cam 56 which has a predetermined cam pattern different from the cam pattern of the above-mentioned cam 55. The comb teeth 51, the pins 52, the slotted slider 54, the cam 55, and the cam 56 are attached to an inner holder 57. The inner holder 57 is housed in an outer holder 59. At least two return springs 58 are disposed between the inner holder 57 and the outer holder 59 to push them so that the inner holder 57 is separated from the outer holder 59. Two slides 60 each having, shape of piston are disposed between the inner holder 57 and the outer holder 59, for restricting a relative movement of the inner holder 57 and the outer, holder 59 in one direction. Each of the slides 60 is engaged with a pin rod 50 provided with a cam follower pin 49 at an end thereof. Each cam follower pin 49 is attached to be capable of sliding with the cam 55 and the cam 56.

Here, an operation of the twisting tool 46 with two cam mechanisms is explained briefly. As shown in FIG. 11(b), if the twisting tool 46 is forcedly pushed to the upper side in the drawing, the comb teeth 51 come in contact with the conductors. Therefore, the inner holder 57 is displaced to narrow a gap with the outer holder 59. In accordance with this displacement, the cam follower pins 49 move slidingly in the inside of the cam 55 and the cam 56. The cam follower pins 49 can not move in lateral directions in FIG. 11. Therefore, each of the cams 55 and 56 itself moves, instead of the cam follower pins 49 which stand still about an inclination direction of the slidable surfaces of each of the cams 55 and 56. At this time, the inclination gradients of the cam patterns on the cams 55 and 56 are determined to work together. As a result, the comb teeth 51 carry out a rocking movement as the pins 52 moves. The rocking movement of the comb teeth 51 may also be referred to as a rotating movement about two rotating axis on the pins 52. The twisting tool 46 moves to a condition at a time of completion of conductor twisting, i.e., a twisted condition, as shown in FIG. 11(b).

Next, the twisting tool 46 is moved below in the drawing, as shown in FIG. 11(c). If a forced pushing of the comb teeth 51 to the conductors is canceled, the inner holder 57 is returned by the return spring 58, and a gap with the outer holder 59 is widened. Then, the cam follower pins 49 integrally formed with the outer holder 59 move along different inclined surfaces on the cams 55 and 56. As a result, the cams 55 and 56 themselves move in a direction different from a condition shown in FIG. 11(b). Thereby; the comb teeth 51 rock in a reverse direction with respect to a direction shown in FIG. 11(b). The comb teeth 51 are rocked to be directed to the perpendicular direction. The twisting tool 46 moves to a condition at a time when the comb teeth are disengaged, i.e., a disengaged condition, as shown in FIG. 11(c).

The twisting tool 46 is further moved below in the drawing, as shown in FIG. 11(d). The comb teeth 51 are separated from the conductors and a forced pushing of the comb teeth 51 toward the conductors is completely canceled. Thereby, the inner holder 57 and the outer holder 59 return to home positions. The cam follower pins 49 move to reference planes on the cams 55 and 56 respectively. Each of the comb teeth 51 are directed in the perpendicular direction. The twisting tool 46 moves to a condition at a time when the comb teeth are returned to the home position, i.e., a home condition, as shown in FIG. 11(d). In the home condition, the cam follower pins 49 are placed to be capable of sliding on the reference surface which has no inclination. Therefore, each of the comb teeth 51 can be rocked by applying an axial force on the slotted slide 54. That is, if the conductor comes in contact with each of the comb teeth 51 in this home condition, it is possible to rock the comb teeth 51 by moving the inner holder 57 in the axial direction.

Therefore, at a beginning stage for inserting the comb teeth 51 into a row of the conductors, in order to engage the comb teeth 51 with the conductors in good condition, the engagement is performed while adjusting a contacting direction to the conductor, by moving the twisting tool 46 in a front and back direction or a up and down direction. The twisting tool 46 is in a condition capable of easily performing an insertion of the comb teeth 51 into the row of the conductors. Then, by pressing the comb teeth 51 onto the conductors, the twisting tool 46 transfers to a condition at a time when the comb teeth 51 are completely inserted, in other words, an engaged condition as shown in FIG. 11(a). Then, an ideal amount of twist on the conductor along an extending direction of the conductor may be formed by rotating while sliding the comb teeth 51 along the conductor.

The conductor twisting device C is considered to perform a kind of reform processing for placing the side surface of the conductor in parallel to the rectangular cross section of the groove on the lower bobbin. Such reform processing can be provided by not only the twisting tool 46, but also the following means. For example, it is possible to employ a processing method and apparatus which makes the conductor to follow a shape of a former which is pressed from radial outside to the conductor. A roller may be employed as a former. It is also possible to employ a comb teeth shaped former on which a shape corresponding to a twisted shape of the conductor under winding process close to the wedge part 67a is formed. It is possible to accommodate the conductor in the upper former by making the conductor to follow the guide groove formed on the upper former, when the conductor is clamped between the upper former and the bobbin after roughly positioning contact locations of the lower bobbin and the conductor. It is possible to employ several kinds of reform processing method and reform processing apparatus according to conditions, such as material characteristics (hardness, rigidity) of the conductor, material shape (thickness, width), and a stretching limit of an insulator.

Next, the frame D is a flat plate bed. A pair of guide grooves are formed on the bed. The winding device A, the conductor supplying device B, etc. are engaged with the guide grooves. The winding device A, the conductor supplying device B, etc. are guided in a reciprocally movable fashion in the axial direction along the guide grooves.

Next, a method for manufacturing the stator winding using the above-mentioned manufacturing apparatus is explained based on FIG. 12 to FIG. 26.

(Forming Step for Base Conductor)

The base conductor forming step S1 is carried out before the winding step. The conductor having a flat rectangular cross section is formed in the base conductor forming step S1. Press working etc. can be used for forming step. In the base conductor forming step S1, the exact shape is provided on the coil end part 7, i.e., a turning part 9. The base conductor forming step S1 may also be referred to as a jumper part forming step S1. The conductor is formed to have a plurality of S-shape parts. The S-shape parts have a shape alternately reversed. In each of the S-shape parts, two inclined parts are placed on both sides of the top part in an offset manner.

Figure 12:
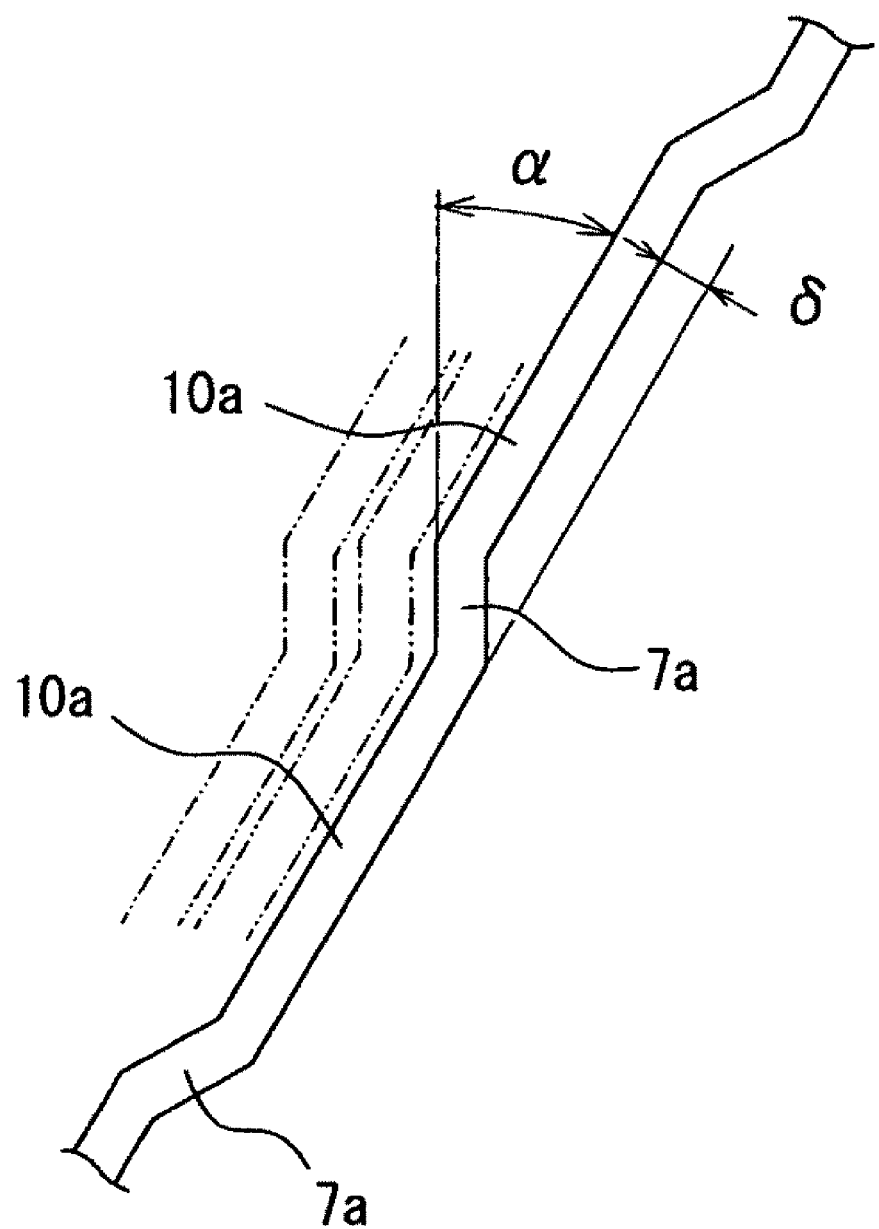
FIG. 12 is a plan view showing a base conductor.

As shown in FIG. 12, the base conductor is formed in an S-shape which is defined by having two reserved jumper parts 7a and two reserved slot conductor parts 10a. The reserved jumper part 7a and the reserved slot conductor part 10a which adjoin at the bent part define the helical angle ALPHA of the helical winding, and incline each other. The helical angles ALPHA are arranged along the longitudinal direction of the base conductor so that the helical angle +ALPHA repeats twice, and then, the helical angle −ALPHA repeats twice. Such a shape meandering by the helical angle ALPHA may be called as an inclined shape or a wave shape. In addition, two reserved slot conductor parts 10a located on both sides of one of the reserved jumper part 7a are arranged to show an offset shape defining an offset distance DELTA therebetween along the longitudinal direction. The offset distances DELTA are arranged along the longitudinal direction of the base conductor so that the offset distance +DELTA and the offset distance −DELTA repeat alternately. Such a shape shifted by the predetermined offset amount DELTA may be called as an offset shape. The base conductor defined by the helical angle ALPHA and the offset distance DELTA has the shape, which may also be called as a trapezoidal wave shape.

Here, the reserved parts means portions on the conductor which are expected to be the slot conductor part or the jumper part on the winding when winding processing is carried out. The base conductor is wound on the conductor bobbin after being processed as mentioned above. As shown in FIG. 10, six conductor bobbins, i.e., the base conductors, are arranged in parallel with each other on the conductor supplying device B. Six base conductors are supplied in parallel from the conductor supplying device B, and are wound. In the following explanation, the base conductor may be called as a conductor.

(Winding Step)

In a winding step, parts of the conductors to be the top parts of the coil ends are fixed on the bobbin which is provided as a winding core. In the winding step, the conductor is bent at a boundary between the slot conductor part and the inclined part. The conductor is formed so that the inclined part extends in a circumferential direction and in almost parallel to an axial end of the stator core. As a result, the conductor is formed in a stepped shape including a plurality of steps. It can be said that the conductors are formed in a wave shape.

The winding step S2 includes 10 steps from a first step where wire members are placed on a condition prepared to be processed, to a tenth step where a winding is completed and is loaded out from a manufacturing apparatus. Hereinafter, each of the steps is explained in detail.

First Step

Figure 13A:
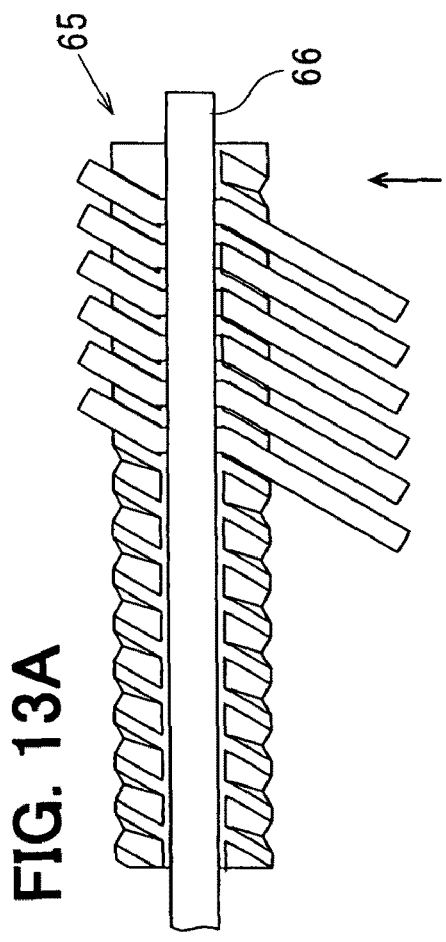
FIG. 13A is a plan view showing a part of the winding device A in the first winding step.
Figure 13B:
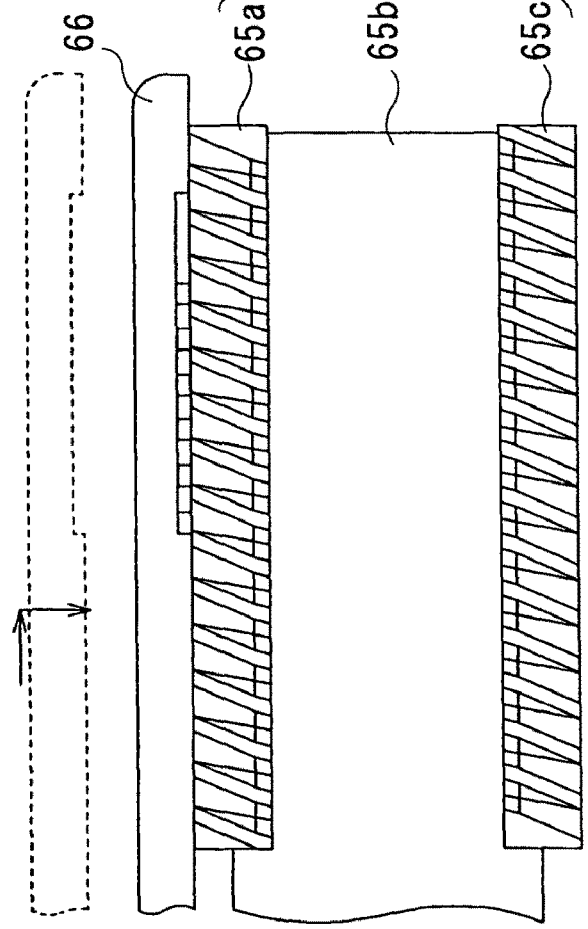
FIG. 13B is a side view along an arrow XIII-B in FIG. 13A.
Figure 13C:
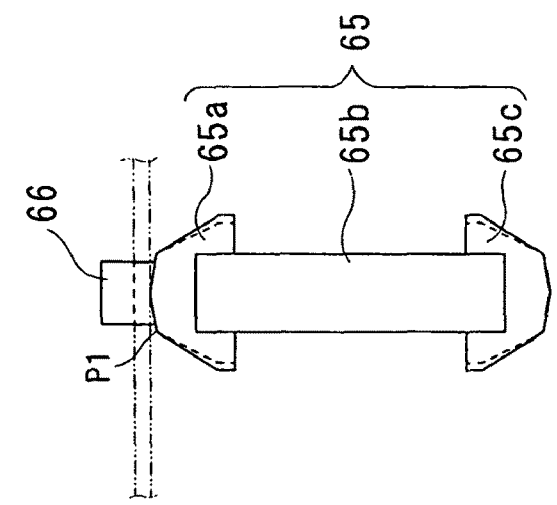
FIG. 13C is a side view along an arrow XIII-C in FIG. 13B.

The first step may be referred to as a wire member setting step or a preparing step. The base conductors are prepared. Then, the base conductors are set on the upper bobbin 65a of the bobbin 65 of the winding device A as shown in FIGS. 13A-C. At this time, attitude of the bobbin 65 is adjusted so that the upper bottom part P1 of the upper bobbin 65a formed in a trapezoidal shape in cross section is placed on an upper side in an up and down direction of the winding device A. Further, the base conductor mounted horizontally so that the S-shape center part of the conductor, i.e., a part 7a reserved to be the jumper part, is overlapped corresponding to the upper bottom part P1.

Then, the wire gripper 66 is moved in the axial direction, after that, is moved toward an axial center, i.e., in the radial direction. As a result, the conductors are fixed by clamping the S-shape center part of each of the conductors between the bobbin 65. At this time, if each of the conductors, i.e., long members, overlaps with the other S-shape offset shape part in the longitudinal direction, an exchanging step is performed so that a conductor placed on a side for beginning the winding step in an axial direction of the bobbin 65 is exchanged to a behind side with respect to a paper surface of the drawing.

Second Step

The second step may also be referred to as a first press bending step or a first bending step for the conductors. As shown in FIGS. 14A-C, the upper former 76 is driven to be moved downwardly in the radial direction to perform a bending process by pressing and clamping the conductors placed on the bobbin 65 between the upper former 76 and the bobbin 65. At this time, simultaneously, the lower support 85 is driven to come in contact with the bobbin 65 to support a pressing load during the bending process. The upper former 76 and the upper bobbin 65a are formed with the guide grooves 41 which are formed in a paired manner. Therefore, it is possible to bend and form the straight-line part 8 at one step, since the conductor is pressed and clamped between them, and then, is wound in a predetermined helical shape.

In addition, regarding a shape of the boundary between the end of the inclined part and the slot conductor part, in this step, the bent angle which shall be defined between the inclined part and the slot conductor part at the completed winding shape can be completely formed in one step. However, it is not limited to the above, it is possible to perform a bending process on the boundary to an intermediate stage, then, the bending process may be completed in a following step, e.g., in the expanding step. It is possible to employ a stepped bending step which includes such a plurality of stages.

Then, the lower support 85 is moved downwardly to release it from support while holding the upper former 76 after completion of the bending process.

Third Step

The third step may also be referred to as a twisting step for the slot conductor part. At the third step, it is performed to control and adjust arranged attitudes of the conductors which are placed between the upper and lower bobbins 65a and 65b. The conductors are adjusted to rotate orientations of cross section between the upper and lower bobbins 65a and 65b. In other words, the conductors are rotated so that the both side surfaces are reversed between the upper and lower bobbins 65a and 65b. This rotation may be referred to as twist. The third step is performed after forming process of the first bending step, a preceding step, for the conductor by using the upper bobbin 65a, and is performed before forming process of the second bending step, a following step, for the conductor by using the lower bobbin 65c. The third step rotates the orientation of the cross section of the conductor so that the location of the conductor is corresponds to the shape of the guide groove 41 formed on the lower bobbin 65c. The third step 3 makes it possible to surely perform a helical winding processing.

A rotating twist on the conductor is carried out as shown in FIGS. 15A-C. The bobbin 65 is supported by driving the horizontal support 78 to move forward. The comb teeth 51 are inserted into gaps between the conductors in a sliding manner by driving the conductor twisting device C to move the twisting tool 46 forward. At this time, inserting position of the comb teeth 51 is the same height as the top end of the lower bobbin 65c or a near position thereof. It is desirable to adjust the inserting position of the comb teeth 51 as close to the lower bobbin 65c as possible. After winding the slot conductor part onto the bobbin 65, the twisting rotation is given to the conductor at a position which is a trailing end of the slot conductor part, i.e., an end connecting the slot conductor part and the inclined part. As a result, a twist is given to the whole slot conductor part.

In order to engage the comb teeth 51 to the conductors, the twisting tool 46 moves forward while slightly moving the comb teeth 51. When engaging the comb teeth 51 to the conductors, the conductors are positioned in a sloping fashion in a helical shape with respect to the rotating axis of the bobbin 65. Further, at this time, the conductors are slightly twisted so that corner parts of the conductors project outwardly. In order to make the comb teeth 51 come in contact with the side surfaces of the conductors, the twisting tool 46 is moved forward while moving the comb teeth 51 in the direction of the rotating axis. In addition, the twisting tool 46 is moved forward while slanting the comb teeth 51 so that the larger side surface of the conductor corresponds to a contact surface of each of the comb teeth 51. This can be performed by using the twisting tool 46 with two cam mechanisms which enables the comb teeth 51 to move in an axial movement and a rocking movement. An L shape notch formed on the end of each of the comb teeth 51 provides a main surface which can come in contact with a wider side surface of the conductor and a sub surface which can come in contact with a narrower side surface of the conductor. Thereby, the comb teeth 51 can stably hold the conductors of a rectangular cross section.

Figure 16C:
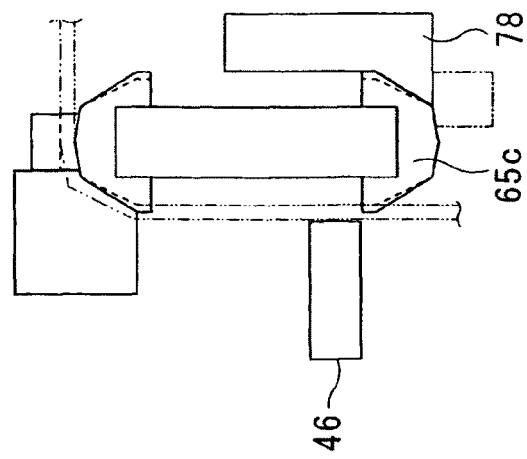
FIG. 16C is a side view along an arrow XVI-C in FIG. 16B.
Figure 16A:
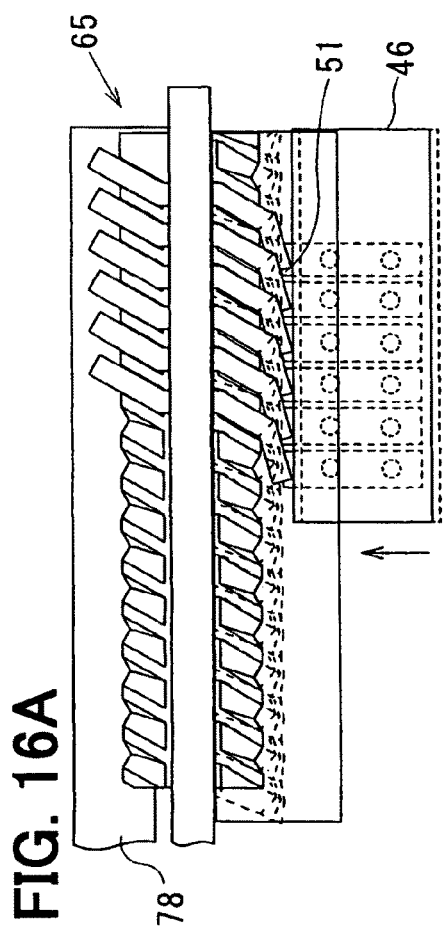
FIG. 16A is a plan view showing a part of the winding device A in a finishing step of the third winding step.
Figure 16B:
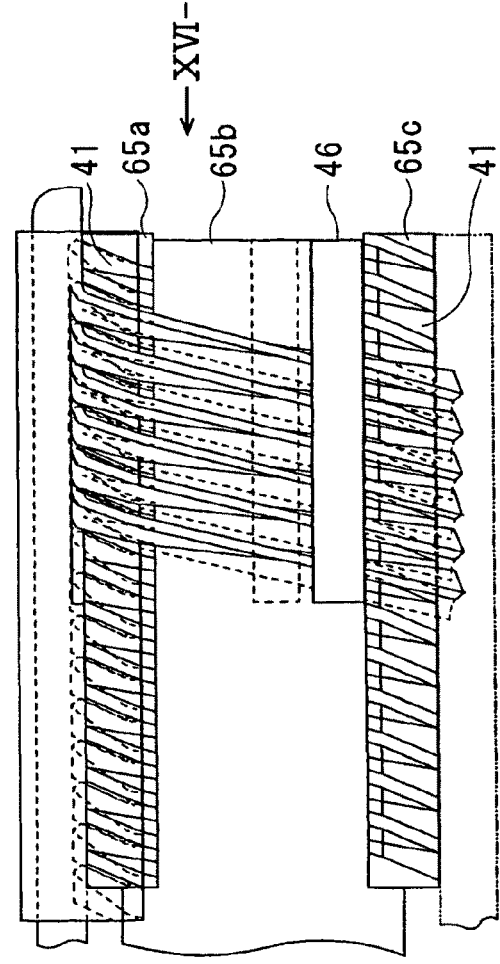
FIG. 16B is a side view along an arrow XVI-B in FIG. 16A.

A plurality of conductors are collectively twisted by moving the comb teeth 51 after the comb teeth 51 are engaged with the conductors. Thereby, as shown in FIG. 16A-C, the conductors between the upper bobbin 65a and the lower bobbin 65c are twisted by 180 degrees in a twisting angle. One of the side surfaces on the conductor which is accommodated in the guide groove 41 on the upper bobbin 65a and faces the bottom surface of the guide groove 41 is turned over. Therefore, the other side surface of the conductor is positioned to face the bottom surface of the guide groove 41 on the lower bobbin 65c. As a result, the conductor is formed to a shape which can be received in and fit along a shape of the guide groove 41 on the lower bobbin 65c.

Fourth Step

Figure 17C:
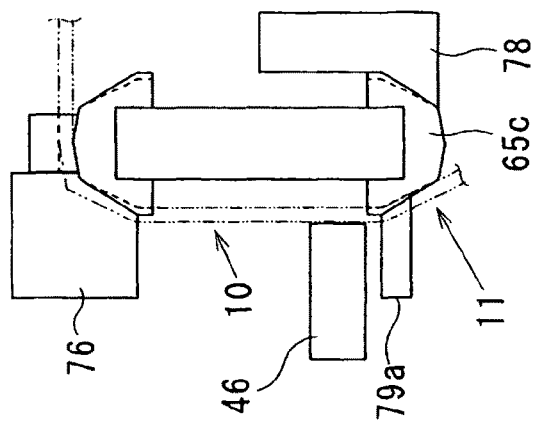
FIG. 17C is a side view along an arrow XVII-C in FIG. 17B.
Figure 17A:
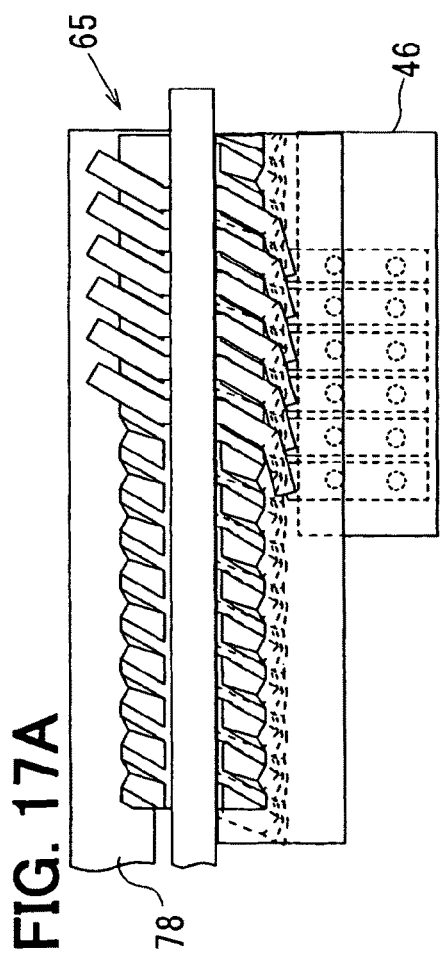
FIG. 17A is a plan view showing a part of the winding device A in a primary step of a fourth winding step.
Figure 17B:
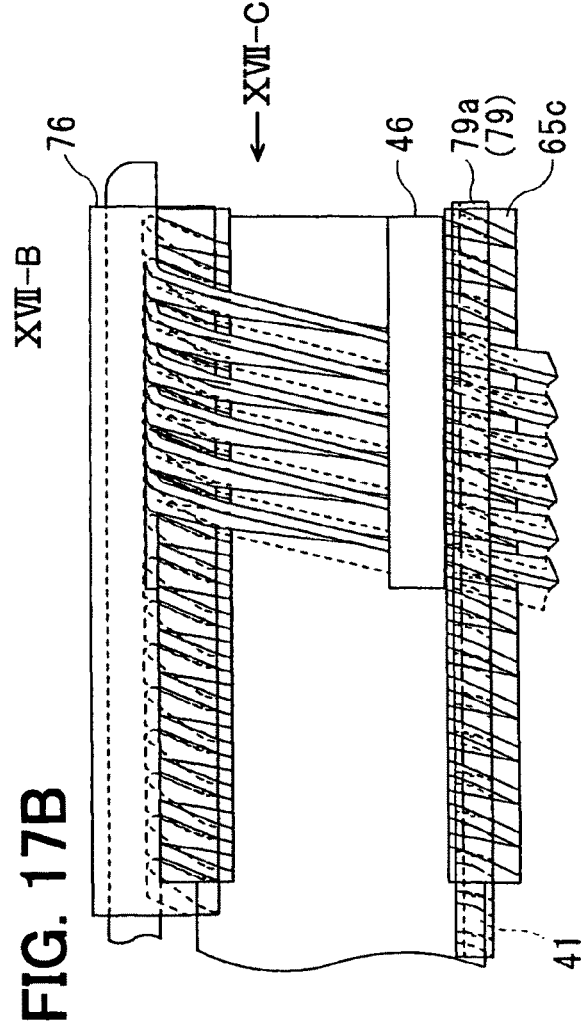
FIG. 17B is a side view along an arrow XVII-B in FIG. 17A.

The fourth step may be referred to as a second press bending step for the conductor. As shown in FIG. 17A-C, the twisting tool 46 and the horizontal support 78 are held in the location of the last step. While keeping the above condition, simultaneously, the lower former 79 is advanced (moved upwardly) so that the conductors are press clamped and formed in gaps between the guide grooves 41 on the lower former 79 and the guide grooves 41 on the lower bobbin 65c. The lower former 79 has the guide grooves 41 which are formed by transferring the winding shape. Therefore, each of the conductors is forcedly inserted into each of the guide grooves 41 on both sides by clamping and is formed into a bent shape. As a result, the coil end inclined parts 11 are formed. At the fourth step, the same processing, work can be obtained as the above-mentioned second step.

The lower former 79 is a two separatable former. First, forming process is performed by using the partial former 79a, and then, forming process is performed by using the partial former 79b. That is, a press bending process, is performed from a portion which is relatively close to the conductor fixed by pushing it onto the lower bobbin 65c by the twisting tool 46 and is expected a relatively small amount of bending deformation. In other words, the press bending process is performed from the partial former 79a which is located on a leading side. Here, the leading side and the trailing side correspond to distances, on the conductor, from a portion where the bending process is already completed. Therefore, the leading side is close to a portion where the bending process is already completed, and the trailing side is close to a portion where the bending process is not yet performed.

In the embodiment, this step alone completely forms the boundary between the coil end inclined part 11 and the slot conductor part 10 into a bent angle which is defined between the coil end inclined part 11 and the slot conductor part 10 at the completed shape of the winding. Alternatively, the boundary may not be formed into the final bent angle in one step, the bending process may be performed up to a middle stage thereof in the fourth step. The forming process to the final bent angle may be divided into a plurality of stages. Bent angles on the boundary in each of the steps may be determined in view of an easiness of winding process and an easiness of process at the expanding step. It is possible to improve a flexibility of processing by appropriately dividing a forming process on the boundary.

Figure 18C:
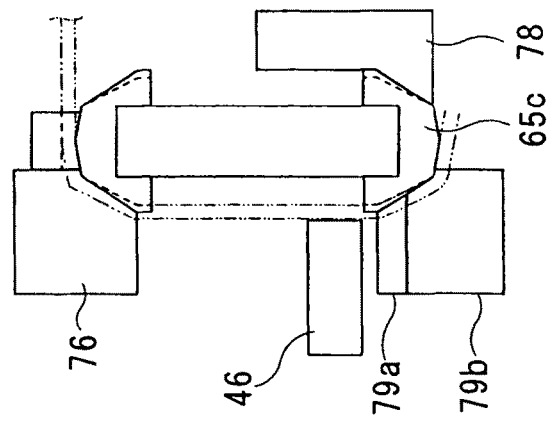
FIG. 18C is a side view along an arrow XVIII-C in FIG. 18B.
Figure 18A:
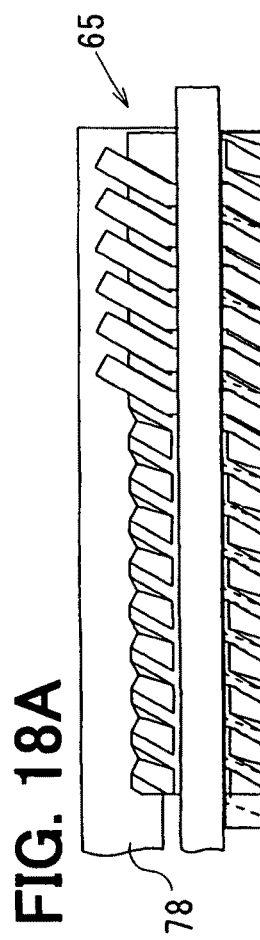
FIG. 18A is a plan view showing a part of the winding device A in a secondary step of the fourth winding step.
Figure 18B:
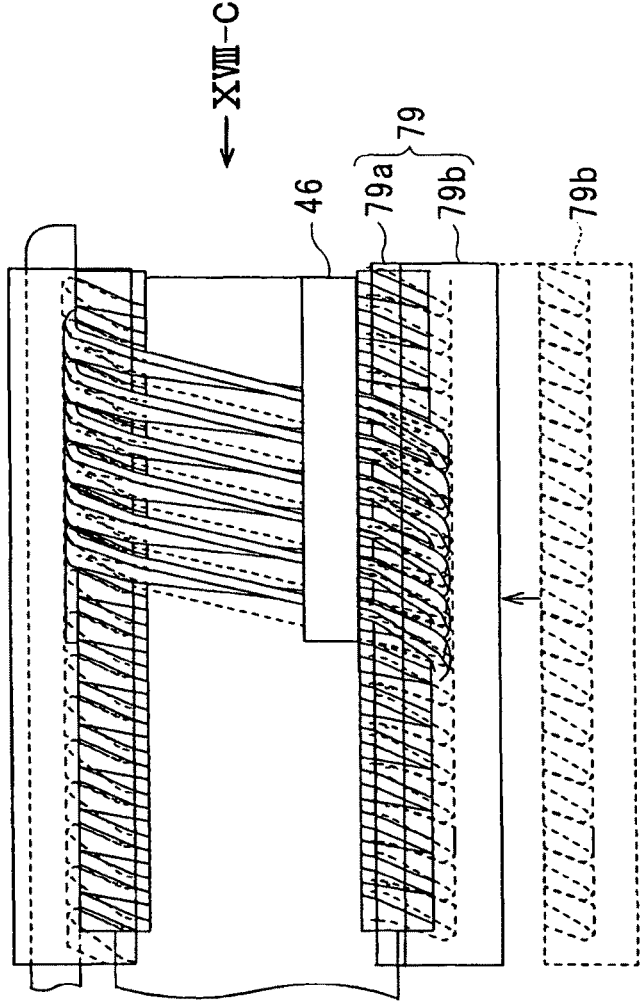
FIG. 18B is a side view along an arrow XVIII-B in FIG. 18A.

Next, as shown in FIG. 18A-C, the partial former 79b on the trailing side is moved forward to perform a press bending while fixing the location of the twisting tool 46 and the partial former 79a on the leading side. Thereby, it is possible to ensure holing of the conductors by the twisting tool 46 and the partial former 79a on the leading side. Therefore, a press bending process by the partial former 79b on the trailing side hardly makes an undesirable shifting of the conductors.

The former includes a leading side partial, former which is located on a leading part of the conductors and performs a press bending on the conductors in advance, and a trailing side partial former which is located on a trailing part of the conductors and performs a press bending on the conductors after the leading side partial former. The location of the press bending work by the partial former 79b on the trailing side is the right side on the drawing. However, the processing locations by two separatable formers 79a and 79b are convertible.

As mentioned above, a winding of half round region (180 degrees) is manufactured by a series of steps to this step as explained. This half winding includes a first bent part, the twisted part, and a second bent part.

In this embodiment, a twist is given to the conductor itself in the winding step. In an expanding step, the twisted shape is undone by rotating the conductor in a reverse direction to the twist. The twist is given over a region from the inclined part in the stator winding to the whole slot conductor part. The twist reaches to the inclined part of the coil end exceeding the slot, conductor part. The twist is given in the manufacturing method which supplies the conductor toward a loop in a helical shape. The twist is given by guiding the conductor to the predetermined location and angle on the bobbin. The twist is given depending on the shape of a surface of the bobbin. The twist is given to the conductor at least a part of one round of the helical shape. The twist is given so that a propelling direction of the loop of the helical shape is similar to a tangential direction of the twist at an inner side of the loop. The twist is given so that an inner side surface of the bent part at the boundary between the inclined part and the slot conductor part faces toward inside of the twisted shape. In other words, it is given so that the outer side surface of the bent part at the boundary between the inclined part and the slot conductor part faces toward outside of the helical shape. Further in other words, the inside surface of the bent part faces the bobbin. Such twist generates an elastic restoring force in which two inclined parts located on the both sides of one slot conductor part are rotated in opposite directions about a rotating axis which is the slot conductor part. In order to utilize the elastic restoring force, in the winding step, the conductor is deformed to preserve an elasticity of the conductor. In detail, an amount of twisting on the inclined part and an amount of twisting on the slot conductor part are determined to preserve the elasticity. In addition, in the winding step, the conductors are held on the bobbin to maintain the twisted shape against the elasticity of the conductor. The top part of the coil end part is deformed into a shape where the conductor is bent. No twisting deformation is given to the top part.

Figure 19C:
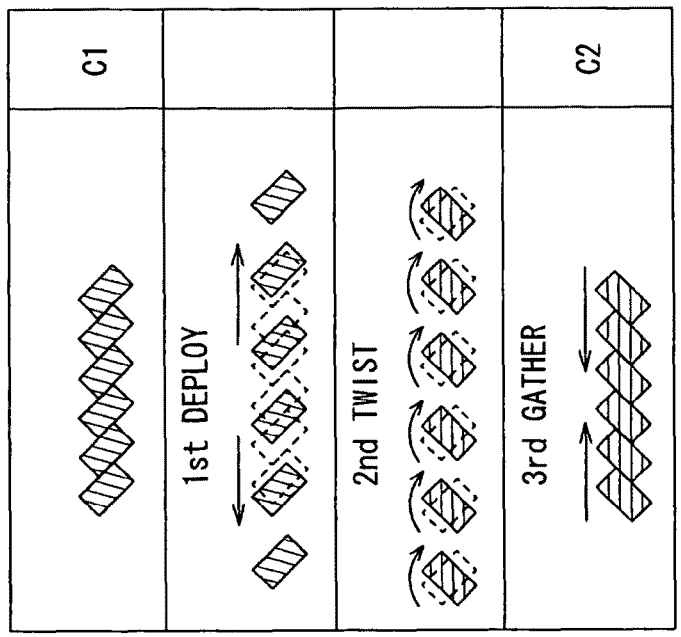
FIG. 19C is a flow chart showing a processing sequence of the overlapping order exchanging step.
Figure 19A:
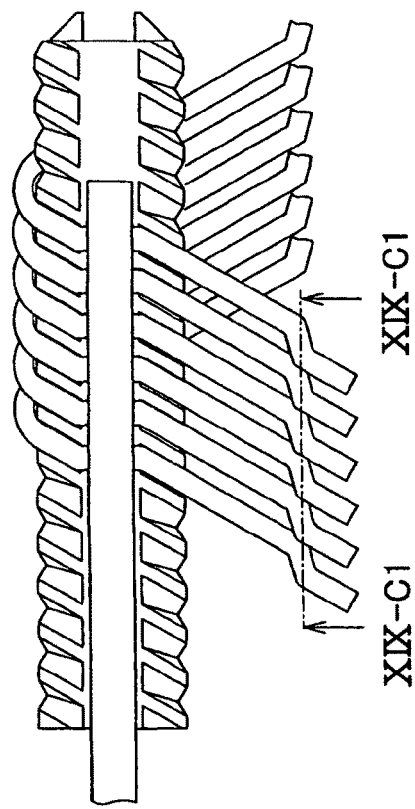
FIG. 19A is a plan view showing a shape before performing an overlapping order exchanging step.

Next, as shown in FIG. 19A, the bobbin 65 is rotated by half circumferentially. Thereby, a supplying direction of the conductor is maintained continuously in a lateral direction with respect to the bobbin 65. Then, the overlapping order exchanging step which exchanges a top to bottom overlapping direction of the conductors in a reverse manner is performed. In this embodiment, after forming the coil end inclined part 11 in the first press bending step or the second press bending step, the S-shape parts of each conductors which are not yet wound may overlap each other. The overlapping order exchanging step exchanges a top to bottom order of the overlapping direction of the conductors in a reverse manner. Thereby, it is possible to prevent the conductors adjacent to each other from interfering therebetween in the following press bending step. In the overlapping order exchanging step, an overlapping order of a plurality of conductors arranged in parallel is exchanged so as to correspond to an overlapping order of the inclined parts which order shall be provided by the inclined parts when they are assembled on the stator core as the stator winding.

Figure 19B:
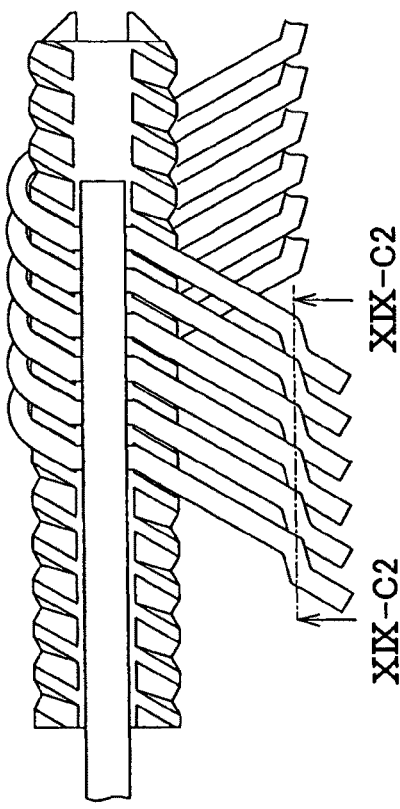
FIG. 19B is a plan view showing a shape after performing the overlapping order exchanging step.

In the overlapping order exchanging step, as shown in FIGS. 19A-C, a guide member is used as a processing means. By this mechanism, as shown in FIG. 19C, first to third steps are performed. The first step is a deploying step which disperses a group of the conductors. The second step is a conductor twisting step which twist the conductors so as to reverse inclination direction thereof in an up and down direction. The third step is a compressing step which gathers the group of the conductors. As a result, as shown in FIG. 19B, the conductor placed on a side for beginning the winding step in the axial direction is replaced a behind side with respect to a paper surface of the drawing. The arrangement of each of the conductors which are not yet formed by winding is reversed by the overlapping order exchanging step at every process of press bending.

Next, the winding step is continued under a condition shown in FIG. 19A. In detail, winding process is performed for a following half circle by the third bending and the fourth bending. As a result, a winding of one round is manufactured by performing from the first to fourth bending steps. If predetermined rounds of winding are wound, the process transfers to a step for taking out the winding.

Fifth Step

Figures 20A, 20B:
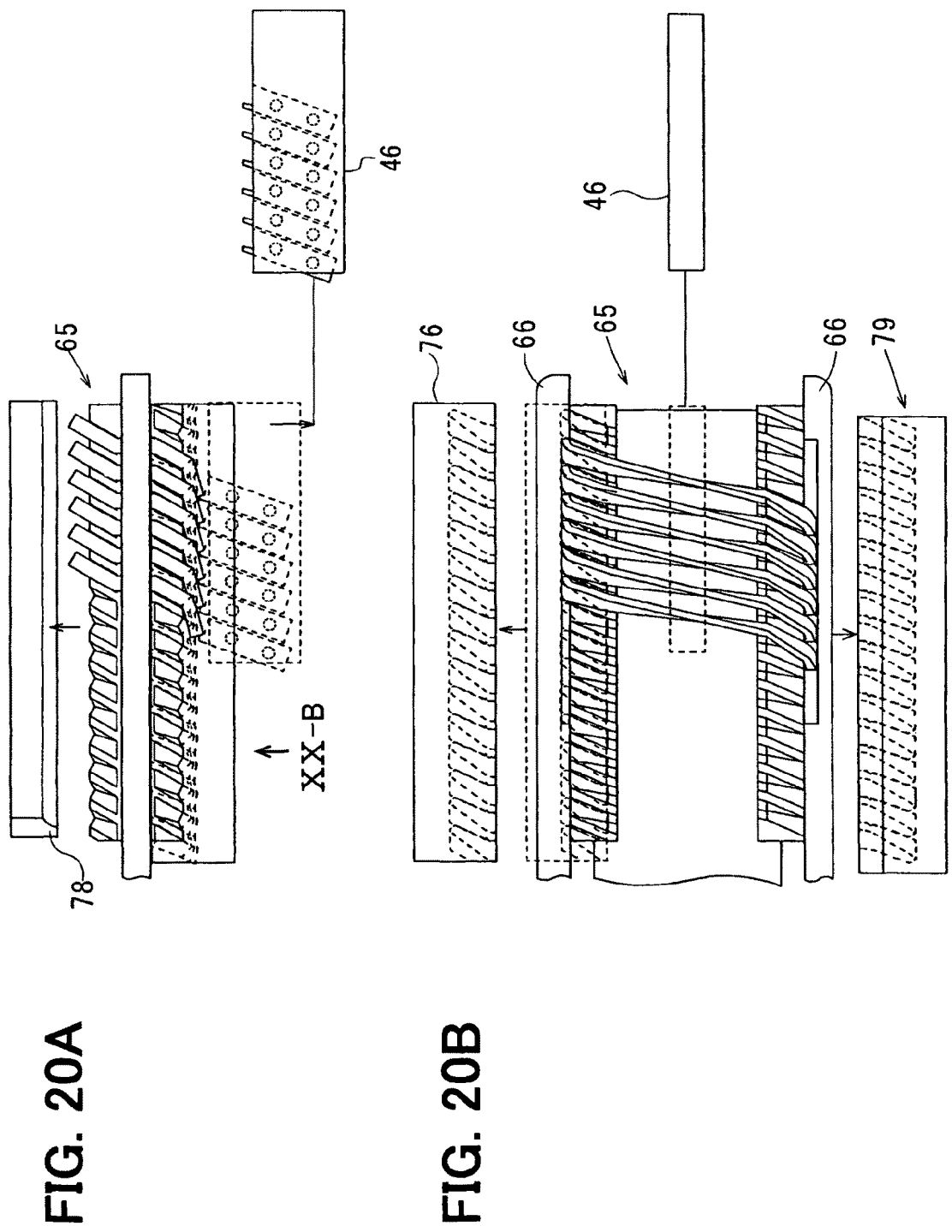
FIG. 20A is a plan view showing a part of the winding device A in a fifth winding step.
FIG. 20B is a side view along an arrow XX-B in FIG. 20A.

The fifth step may also be referred to as a former releasing step for releasing the formers which forms the conductor by pressing. First, as shown in FIGS. 20A-B, the lower former 79, the twisting tool 46, the horizontal support 78, and the upper former 76 are returned to home positions. The wire gripper 66 is held in the location where it clamps each conductor between the bobbin 65. Next, the process transfers to a rotating step for rotating the bobbin 65 and the wire gripper 66 by 180 degrees in a predetermined direction.

Sixth Step

Figure 21A:
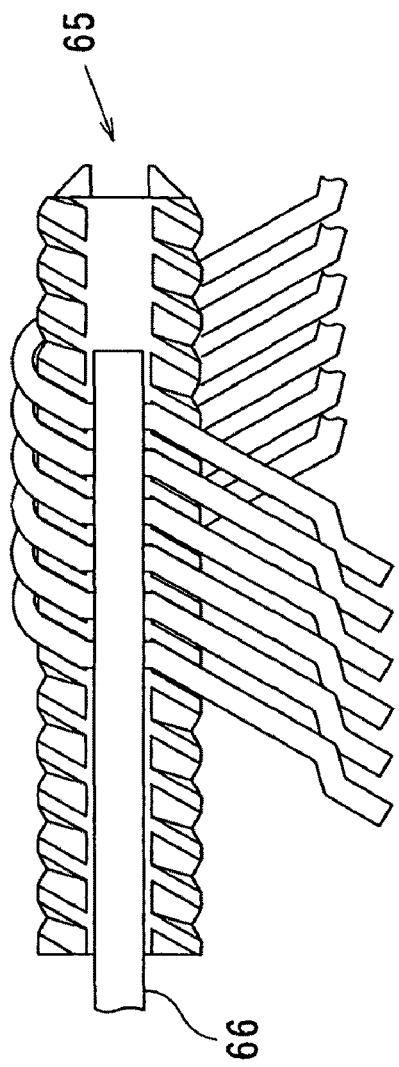
FIG. 21A is a plan view showing a part of the winding device A in a sixth winding step.
Figure 21B:
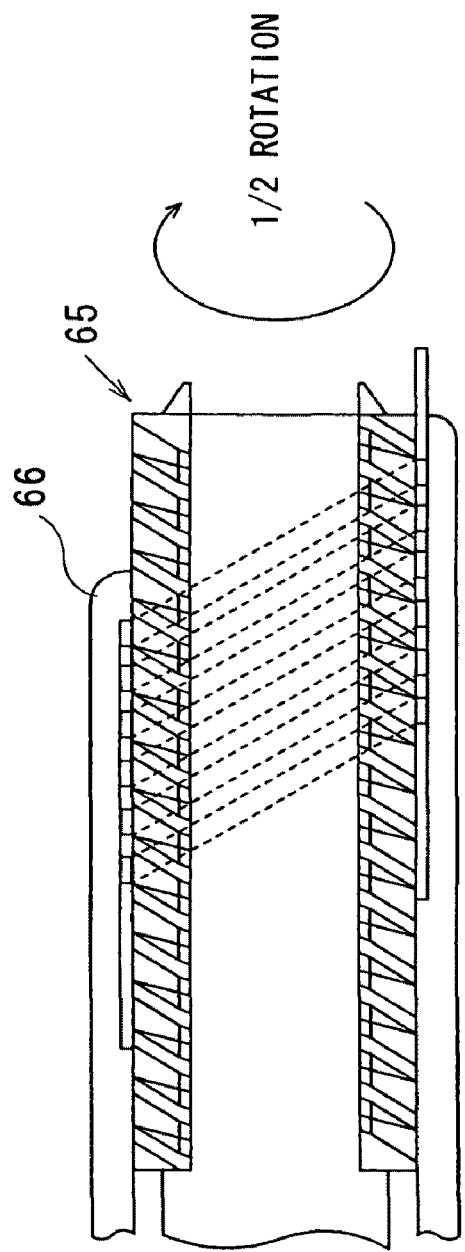
FIG. 21B is a side view along an arrow XXI-B in FIG. 21A.

The sixth step may be also referred to as a rotating step for rotating the bobbin. In this step, as shown in FIGS. 21A-B, the bobbin 65 and the wire gripper 66 are rotated by half rotation (180 degrees) in a predetermined direction. At this time, the conductors from the conductor supplying device B are extended long by making it curved in a large loop shape to an extent which can prevent the conductor from generating a plastic deformation by the rotation. Further, the conductors on supplying sources are rotated in a direction which releases twist on the conductors wound.

The conductor supplying device B can perform the above-mentioned procedure by only rotating the conductor bobbins. Therefore, it is compact and energy saving, as compared with a movable and super-heavy weight conductor bobbin. In addition, it is possible to be adapted to a request for increasing a manufacturing speed easily.

Seventh Step

The seventh step may also be referred to as a shrinking step for shrinking the bobbin. As shown in FIGS. 22A-E, the contact recess formed on the axial center of the holder 68 is made come in contact with the contact protrusion on the axial end of the bobbin 65 by moving the holder 68 forward. The wedge part 67*a* of the wedge mechanism 67 is disengaged with the bobbin 65 by displacing the wedge mechanism 67 attached on the bobbin 65 in an opposite direction to the winding core.

Then, as shown in FIG. 22E, the bobbin 65 is shrunk inwardly. Thereby, it is possible to be the winding detachable from the bobbin 65.

Eighth Step

Figure 23A:
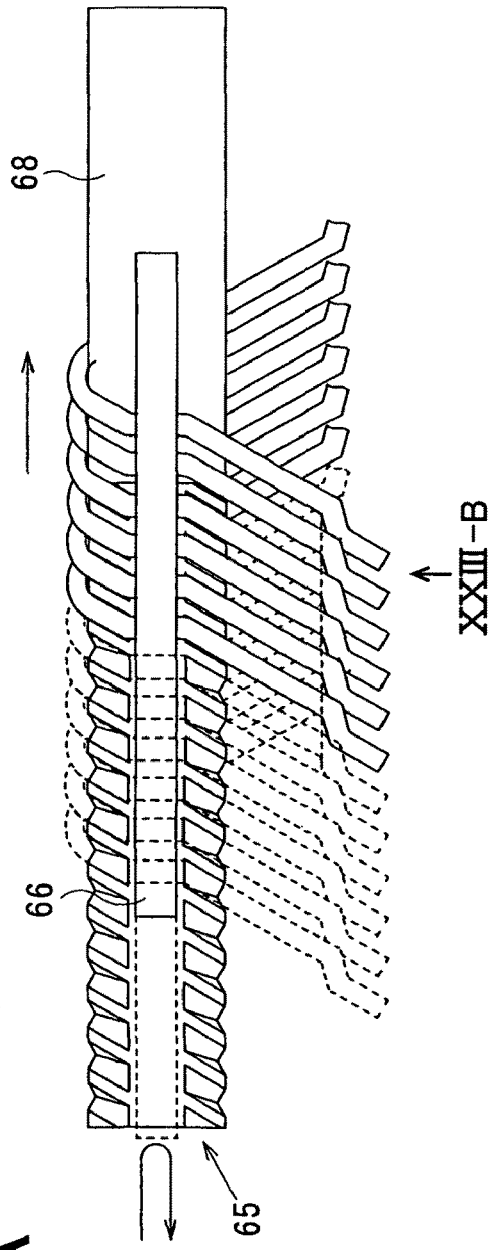
FIG. 23A is a plan view showing a part of the winding device A in an eighth winding step.
Figure 23B:
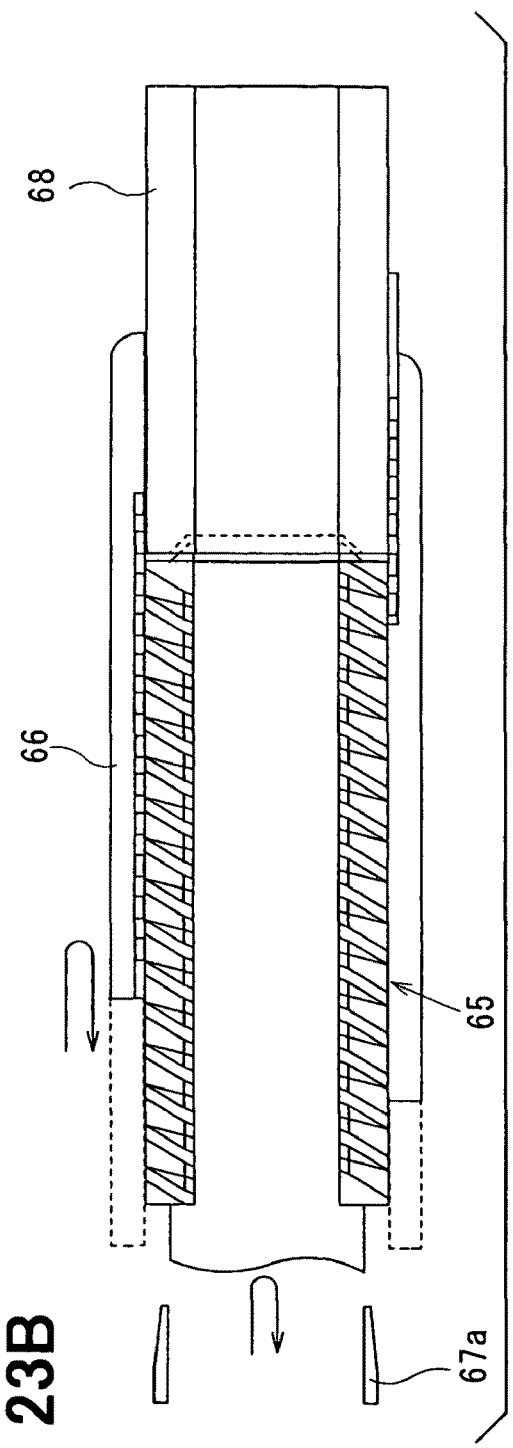
FIG. 23B is a side view along an arrow XXIII-B in FIG. 23A.

The eighth step may also be referred to as a transferring step which moves the winding from the bobbin to the holder. As shown in FIG. 23A-B, the wire gripper 66 is moved forward in a direction toward the holder 68 to move the winding wound by one round toward the holder 68. An apparatus is returned to an initial position after the winding is transferred for one round pitch distance. In detail, the wedge parts 67*a* are moved forward by driving the wedge mechanism 67. Simultaneously, the holder 68 is moved backward to the original position until the bobbin 65 expands to an initial shape. Although the winding is transferred to the holder 68 after completing the winding step for one round of the winding, it is possible to perform the transferring step to the holder 68 after completing the winding step for a plurality of rounds of the winding. For example, the winding may be transferred to the holder 68 after completing the winding step for rounds necessary for one product.

After the winding is transferred, the wire gripper 66 is moved outwardly in the radial direction with respect to the bobbin 65 to release the winding from holding condition. Then, the wire gripper 66 is moved backward in the axial direction of the bobbin 65. Furthermore, the wire gripper 66 is moved inwardly in the radial direction to hold the conductors by the distal end part of the wire gripper 66, i.e., to a condition that is the same as the condition in the second step.

Ninth Step

The ninth step may be also referred to as a fifth and sixth press bending step both for winding the conductors. In the following step, the above-mentioned step is repeated. The fifth press bending step is the same as the first press bending step. The sixth press bending step is the same as the second press bending step. As the winding step for a certain number of winding necessary for the stator winding is completed by repeating the above-mentioned step, the conductors are cut by a cutter etc. to left length necessary for lines, such as leader lines.

Tenth Step

Figure 24A:
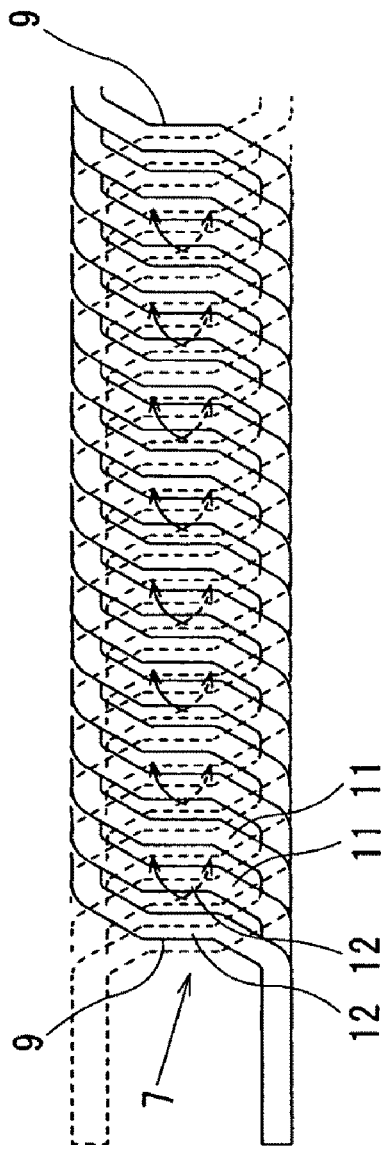
FIG. 24A is a plan view showing a shape at a time after releasing the winding and before an expanding step.
Figure 24B:
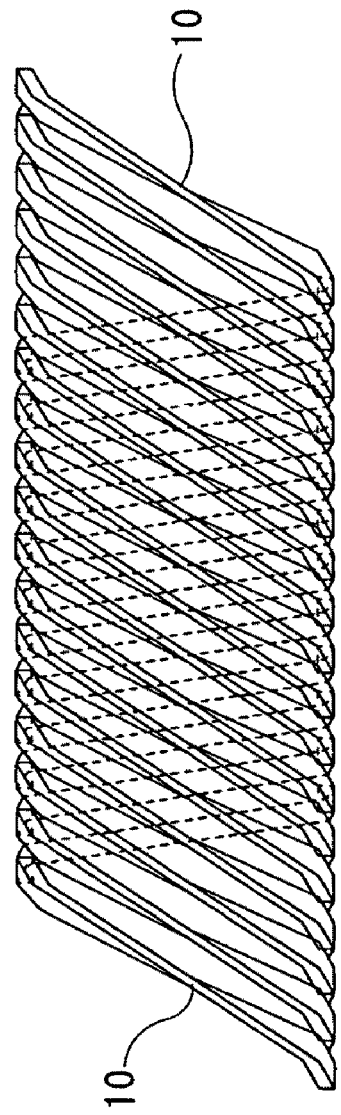
FIG. 24B is a side view along an arrow XXIV-B in FIG. 24A.

The tenth step is also called as a detaching step for detaching the winding. The winding is detached by backwardly retracting the holder 68. At this time, the winding is detached by gripping the slot conductor parts 10 by a predetermined tool etc. in a collective manner. The winding detached from the holder 68 may be also called as the winding assembly 5 or a preform product. In the preform product, a plurality of conductors form a flat cylindrical shape. The preform product has a predetermined length. In a form of the preform product, a plurality of conductors are helically wound in a high density fashion. In the preform product, as shown in FIGS. 24A-B, a part to be the coil end part 7 in the winding extends in the radial direction of the winding, i.e., in a perpendicular direction with respect to the width direction of the winding. In addition, in the form of the preform product, a part to be the slot conductor part 10 extends in an inclined fashion. A part to be the coil end part 7 in placed on a short hand side and shows the S-shape. A part to be the slot conductor part 10 in placed on a long hand side and extends as the sloping part.

(Expanding Step for Winding)

The expanding step S3 includes two steps. The expanding step S3 transforms the winding assembly into the shape of the stator winding by deforming the winding assembly in a radial direction of the helical shape. The expanding step S3 may also be referred to as a pressing step which transforms the winding assembly into the shape of the stator winding by pressing the winding assembly in a direction which intersects perpendicularly with the propelling direction of the helical shape or the axis of the helical shape. In other words, the winding assembly formed in a flat cylindrical shape is transformed into the shape of the stator winding by being pressed inwardly along the radial direction thereof, i.e., inwardly along the thickness direction. The expanding step is performed about the rotation center which is an axis passing through the slot conductor part and is parallel to a line passing through the top of the coil end part and being vertical to the axis of the helical shape. In the expanding step, the coil end inclined parts on the both sides of the slot conductor part are rotated about the above-mentioned axis which is used as the rotation center. In the expanding step, an inclined part placed on one side of the slot conductor part and an inclined part placed on the other side are expanded in opposite rotating directions each other. The expanding step may also be referred to as an inclined parts rotating step. The above-mentioned axis for the rotation center may be understood as an axis which passes the slot conductor part belonging to each loop and is parallel to a straight line which connects the top part on each loop of the helical shape and a center point of the loop.

Primary Step

Figure 25A:
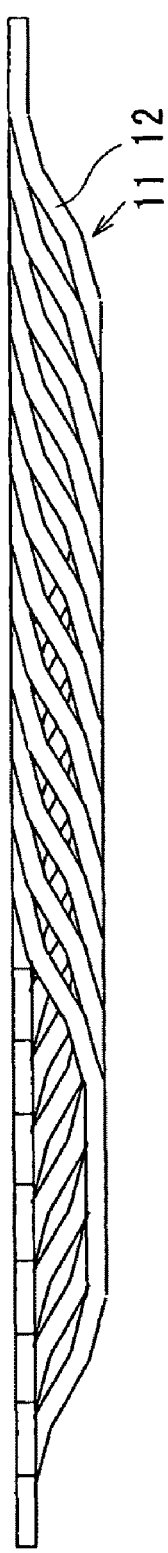
FIG. 25A is a plan view showing a winding in a first expanding step.
Figure 25B:
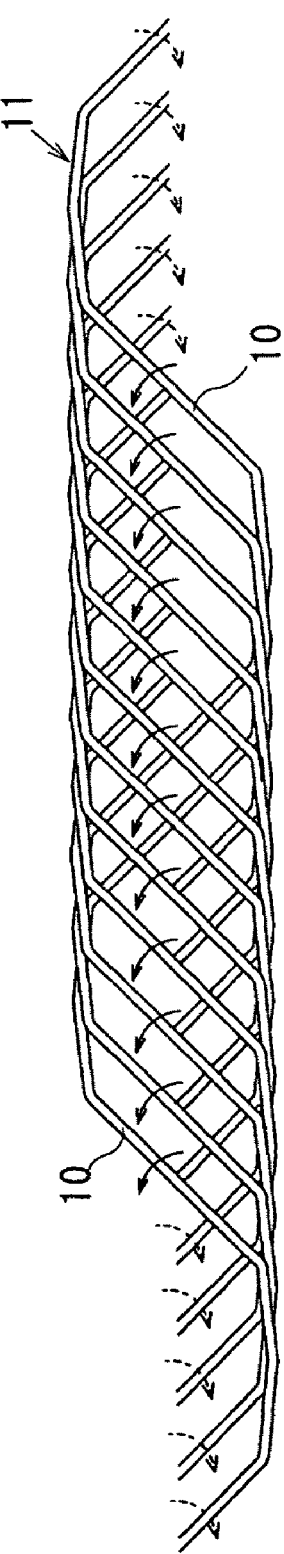
FIG. 25B is a side view along an arrow XXV-B in FIG. 25A.

The primary step may also be referred to as a rotating step for rotating the inclined parts. In the rotating step, a preform product is transformed so as to be extended in an axial direction of winding. The preform product is transformed to be an even thinner cylindrical shape. The preform product is transformed in a direction which makes a width of the preform product narrower, i.e., in a direction which makes a length in a winding direction of the winding longer (extended). The transformation is obtained by rotating each of the coil end inclined parts 11 on both sides about a center which is each coil end top part 12. Rotating directions of the inclined parts 11 in the coil end are indicated by arrow symbols in FIG. 24A. In other words, a paired, two inclined parts 11 and 11 on the coil end are displaced so as to be separated along the axial direction of the preform product. As a result, the preform product is transformed in a flat cylindrical shape as shown in FIGS. 25A-B. Pressing may be performed so that the slot conductor parts 10 arranged in two rows placed on both sides of the preform product come in close contact with each other in the width direction. In the preform product, the slot conductor parts 10 are wound with high density in a folding and stacking manner by giving twist to the conductors themselves. Therefore, if the preform product is released from the predetermined jig, the preform product expands to spread the folding and stacking in the winding direction by receiving assist of the elastic restoring force of the twist. Simultaneously, the preform product shrinks in the width direction. Furthermore, an external force which compresses the preform product in the thickness direction is applied by a pressing etc. As a result, the preform product can be expanded, by applying the external force and also applying the elastic restoring force, so that the slot conductor parts 10 come in close contact with each other.

In this embodiment, a twist is given to the conductor itself in the winding step. In the expanding step, the twisted shape is undone by rotating the conductor in a reverse direction to the twist.

Secondary Step

Figure 26:
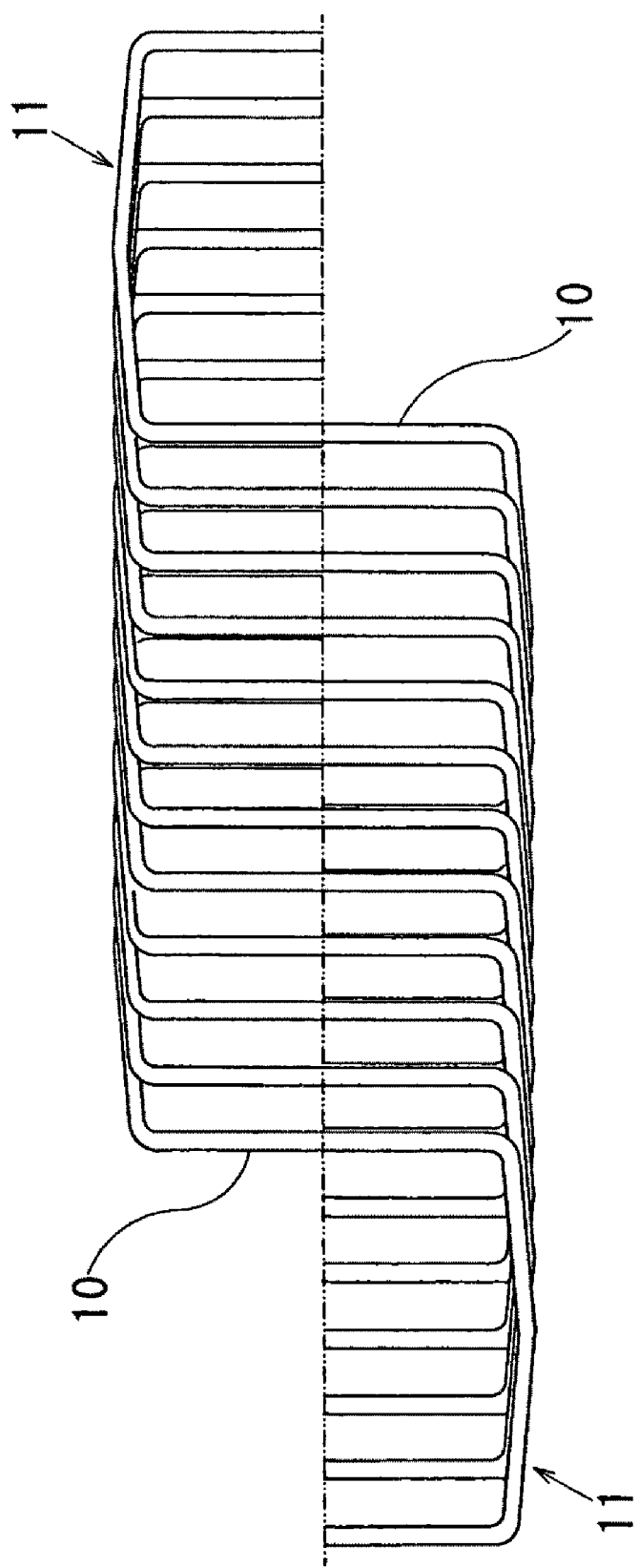
FIG. 26 is a side view showing a winding in a second expanding step.

The secondary step may be referred to as a forming step or a bending step which forms the slot conductor part into an expected shape. In the forming step, bending work shown by an arrow symbol in FIG. 25B is carried out. The bending work is carried out so that the shape shown in FIG. 26 is provided. By performing this work, the slot conductors 10 are arranged in accordance with directions of the slots 2 on the stator core 3. As a result, it is possible to obtain the stator winding having a predetermined shape. A plurality of slot conductor parts 10 in the stator winding have predetermined shapes respectively, and are arranged to be distanced by a predetermined pitch each other. The slot conductor part is rotated to be in accordance with a depth direction of the slot of the stator core. In addition, this step can be eliminated, if a bending process for the slot conductor parts 10 is completely performed at a winding process.

(Winding Assembling Step)

The winding assembling step S4 is an assembling step for the stator winding 4 which combines the winding expanded into the predetermined shape in the above-mentioned expanding step S3 and the stator core 3. The expanded winding is assembled into the stator core 3 at this step. In addition, leader lines are formed. Further, some jumper line connections are carried out by means, such as welding, and the stator winding 4 is completed.

As mentioned above, it is possible to manufacture a fine stator winding 4 in an easy and stable manner by performing a series of steps S1-S4 sequentially.

Thus, in the embodiment, the base conductor forming step S1 which forms S-shaped offset shapes on the conductor is carried out before the winding step. S2. As a result, it is easy to provide exact shapes on the jumper parts which run in the radial direction of the winding.

In the winding step S2, the winding assembly 5 which is continuous and made of loops in the helical shape is formed by winding the base conductor with the offset shape on the winding core. At this time, the coil end inclined parts 11 and the slot conductor, parts 10 of the winding assembly 5 are given with the twisted shapes. The winding assembly 5 is formed by winding the plurality of conductors in high density in a folding and stacking manner.

Then, the winding assembly 5 is detached from the bobbin 65. The detached winding assembly 5 is processed by performing the expanding step S3 which is a measure in which the coil end inclined parts 11 on both sides are rotated about a center that is the coil end top part 12, the winding folded and stacked is expanded so as to spread it, and the pitch of the slot conductor parts are uniformly arranged. Then, the winding is assembled in the slots 2 of the stator core 3 to manufacture the stator winding 4.

Thereby, it is possible to provide an exact shape on the jumper part by winding the conductors on which the offset shapes are previously formed. In addition, by winding the winding while giving twisted shapes to the coil end inclined parts 11 and the slot conductor parts 10, it is possible to perform folding and stacking of the winding easily, and to wind the winding with high density. In another aspect, it is possible to easily expand the folded and stacked winding by using an assist of the twist restoring force. As a result, it is possible to simplify an apparatus necessary for the expanding step S3. Alternatively, it is possible to decrease processing steps, and, therefore, to manufacture at low cost.

As a result, it becomes easy to perform the expanding step which is the measure for expanding the pitch of the slot conductors by rotating the turning parts 9 on the winding that is folded and stacked. Therefore, it is possible to avoid or suppress applying deformation in opposite directions by pins. As a result, it is possible to avoid forming unnecessary deformations on the slot conductor parts 10 and the turning parts 9. In addition, it is possible to satisfy the linearity and parallelism of the slot conductor parts 10. Therefore, it is possible to improve the space factor of the winding and to form the coil end parts 7 in a uniformly arrayed manner and in a small size.

Therefore, it is possible to provide a small size coil end parts 7 and an improved space factor in the slot in an easy and stable manner.

Other Embodiments

Instead of the above embodiment, it is possible to employ a manufacturing method which performs manufacturing in an order explained below.

The modified embodiment utilizes a characteristic in which a wound shape of the conductor is easily returned (restored) to a former shape, by giving a twisted shape on the conductor. The bent part on a first stage part on the boundary between the slot conductor part 10 and the coil end inclined part 11 shall be bent in a predetermined angle at a completion of bending step. In the winding step S2 for the winding, the bent part is bent so that a bending angle thereof reaches to an angle smaller than the above-mentioned predetermined angle, or the bent part is left without bent at all. Then, in the pressing step for the winding, both an inclined part rotating step and a first stage forming step are performed. The inclined part rotating step rotates the coil end inclined parts 11 on both sides about an axis which is a loop inside and outside radial direction with respect to a center which is a reserved part for the coil end top part 12 on each loop of the winding. The first stage forming step is a press bending process for completely forming the first stage part. It is possible to employ the above manufacturing method. In detail, in the winding step, a bent part on a boundary between the slot conductor part and the inclined part is bent to a bent angle less than a bent angle at a completion of bending or is left without bending. The slot conductor part is made to slope with respect to the helical axis. The expanding step may include an inclined parts rotating step and a bending step. The inclined parts rotating step rotates the inclined parts on both sides about a rotation center which is an axis passing through the slot conductor part and is parallel to a line passing through the top part and being vertical to an axis of the helical shape so that one of the inclined part and the other one of the inclined part are rotated in opposite rotating directions each other. The bending step is performed to form the bent part completely by rotating the slot conductor part so as to correspond to a depth direction of the slot of the stator core.

Thereby, it is possible to reduce manufacturing steps by performing the inclined part rotating step and a first stage part forming step simultaneously, and to manufacture at low cost.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A method for manufacturing a stator winding, which has a plurality of slot conductor parts accommodated in a plurality of slots of a stator core and a plurality of coil end parts connecting the slot conductor parts, the slot conductor parts being located in radial locations which are alternately displaced in an inner side and outer side manner along a circumferential direction, the method comprising:
    a winding step which forms a helical shape winding assembly by winding a conductor on a bobbin; and
    an expanding step which deforms the winding assembly into a shape of the stator winding by deforming in a radial direction of the helical shape, and wherein
    the stator winding is a wave winding, and wherein
    the coil end part has inclined parts and a top part, and wherein
    the conductor has a rectangular shape in cross section, and wherein
    the winding step rotates the conductor itself in a twisted shape, and wherein the expanding step rotates the conductor in a reverse, direction to undo the twisted shape.

2. The method for manufacturing a stator winding in claim 1, wherein the twisted shape appears on the inclined parts and the slot conductor part.

3. The method for manufacturing a stator winding in claim 2, wherein the shape including the twisted shape on the inclined parts is formed by press forming the conductor in the winding step.

4. The method for manufacturing a stator winding in claim 2, wherein the twisted shape is given by applying a twisting rotation force on the conductor at an end of the slot conductor part which is connected to a succeeding one of the inclined part after the slot conductor part is wound on the bobbin.

* * * * *